United States Patent
Moriuchi et al.

(10) Patent No.: US 11,784,339 B2
(45) Date of Patent: Oct. 10, 2023

(54) BATTERY CELL, CELL STACK, AND REDOX FLOW BATTERY

(71) Applicant: SUMITOMO ELECTRIC INDUSTRIES, LTD., Osaka (JP)

(72) Inventors: Kiyoaki Moriuchi, Osaka (JP); Yoshiyasu Kawagoe, Osaka (JP); Seiji Ogino, Osaka (JP); Shin-ichi Sawada, Osaka (JP); Takeshi Yamana, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 182 days.

(21) Appl. No.: 17/419,330

(22) PCT Filed: Jan. 29, 2019

(86) PCT No.: PCT/JP2019/003037
§ 371 (c)(1),
(2) Date: Jun. 29, 2021

(87) PCT Pub. No.: WO2020/157837
PCT Pub. Date: Aug. 6, 2020

(65) Prior Publication Data
US 2022/0085402 A1 Mar. 17, 2022

(51) Int. Cl.
*H01M 8/18* (2006.01)
*H01M 4/96* (2006.01)

(52) U.S. Cl.
CPC .............. *H01M 8/188* (2013.01); *H01M 4/96* (2013.01)

(58) Field of Classification Search
CPC .......................... H01M 8/18–188; H01M 8/20
See application file for complete search history.

(56) References Cited

U.S. PATENT DOCUMENTS

2013/0252041 A1* 9/2013 Fujimoto ............ H01M 4/8636
429/70
2014/0302423 A1* 10/2014 Darling ................. H01M 8/20
429/498
(Continued)

FOREIGN PATENT DOCUMENTS

CN 108292772 A * 7/2018 .............. H01M 4/94
JP 0727837 A1 8/1996
(Continued)

OTHER PUBLICATIONS

CN-108292772-A English machine translation (Year: 2018).*
(Continued)

*Primary Examiner* — Scott J. Chmielecki
(74) *Attorney, Agent, or Firm* — Oliff PLC

(57) ABSTRACT

A battery cell for use in a redox flow battery, the battery cell including an electrode, a membrane facing one of both surfaces of the electrode, and a bipolar plate facing the other surface of the electrode, wherein the bipolar plate includes, in a surface thereof facing the electrode, a flow channel for an electrolyte, the electrode is a porous body containing carbon materials, and a compressive strain in a thickness direction of the electrode when a compressive stress of 0.8 MPa is applied in the thickness direction of the electrode is 20% or more and 60% or less.

21 Claims, 6 Drawing Sheets

(56) References Cited

U.S. PATENT DOCUMENTS

| | | | |
|---|---|---|---|
| 2016/0126579 A1* | 5/2016 | Darling | H01M 8/1039 |
| | | | 429/101 |
| 2017/0012299 A1 | 1/2017 | Itou et al. | |
| 2018/0048008 A1* | 2/2018 | Johnston | H01M 4/88 |

FOREIGN PATENT DOCUMENTS

| | | |
|---|---|---|
| JP | H10-081575 A | 3/1998 |
| JP | 2015-505148 A | 2/2015 |
| JP | 2015-138771 A | 7/2015 |
| JP | 2017-91617 A | 5/2017 |
| JP | 2018-186013 A | 11/2018 |

OTHER PUBLICATIONS

Q. Wang et al., "Experimental study on the performance of a vanadium redox flow battery with non-uniformly compressed carbon felt electrode", Applied Energy 213 (2018) pp. 293-305.

\* cited by examiner

BATTERY CELL, CELL STACK, AND REDOX FLOW BATTERY

TECHNICAL FIELD

The present invention relates to a battery cell, a cell stack, and a redox flow battery.

BACKGROUND ART

Patent Literature (PTL) 1 discloses a redox flow battery including a flow field plate (bipolar plate) provided with a groove serving as a flow channel for an electrolyte, and an electrode. PTL 1 further discloses, as the above-mentioned electrode, carbon paper with a compressive strain of less than 20% under compressive stress of 0.8 MPa.

CITATION LIST

Patent Literature

PTL 1: Japanese Unexamined Patent Application Publication (Translation of PCT Application) No. 2015-505148

SUMMARY OF INVENTION

The present disclosure provides a battery cell for use in a redox flow battery, the battery cell including an electrode, a membrane facing one of both surfaces of the electrode, and a bipolar plate facing the other surface of the electrode, wherein the bipolar plate includes, in a surface thereof facing the electrode, a flow channel for an electrolyte, the electrode is a porous body containing carbon materials, and a compressive strain in a thickness direction of the electrode when a compressive stress of 0.8 MPa is applied in the thickness direction of the electrode is 20% or more and 60% or less.

A cell stack according to the present disclosure includes:
the battery cell according to the present disclosure.

A redox flow battery according to the present disclosure includes:
the battery cell according to the present disclosure or the cell stack according to the present disclosure.

DESCRIPTION OF EMBODIMENTS

Figure 1:
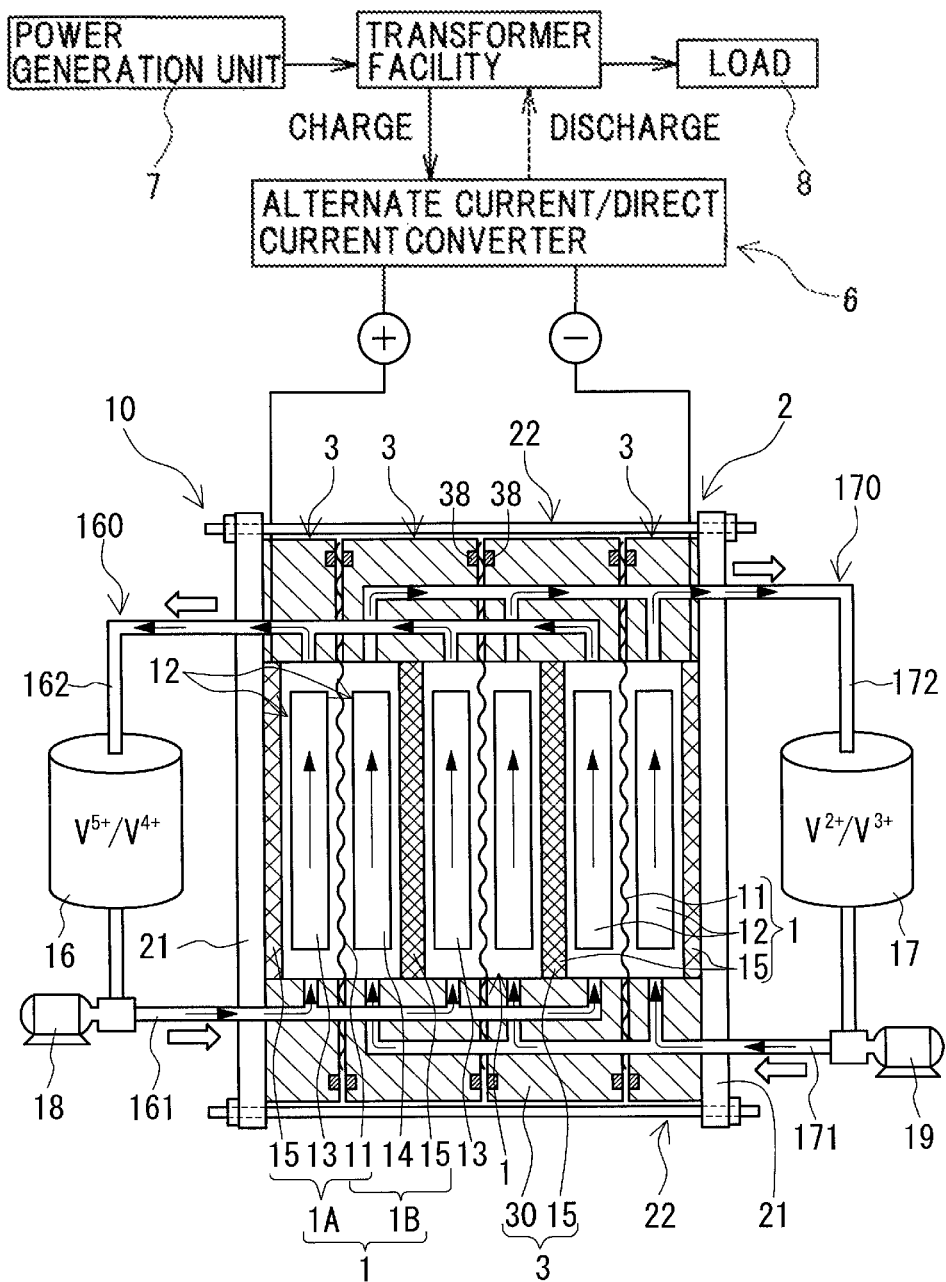
FIG. 1 is an explanatory view schematically illustrating a basic structure of a redox flow battery according to an embodiment.

[Problems to be Solved by Present Disclosure]

PTL 1 discloses that intrusion of the electrode into the groove formed in the bipolar plate is reduced by using the above-mentioned relatively hard carbon paper with the compressive strain of less than 20% under the compressive stress of 0.8 MPa. In addition, PTL 1 discloses that restriction of an electrolyte flow in the groove caused by the electrode having entered the groove is suppressed and hence stability (consistency) of performance is improved. However, using the electrode with the compressive strain of less than 20% under the compressive stress of 0.8 MPa cannot be expected to realize a further improvement of battery performance.

In view of the above-described situation, one object of the present disclosure is to provide a battery cell with which a redox flow battery capable of improving the battery performance can be constructed. Another object of the present disclosure is to provide a cell stack with which the redox flow battery capable of improving the battery performance can be constructed. Still another object of the present disclosure is to provide the redox flow battery capable of improving the battery performance.

[Advantageous Effects of Present Disclosure]

The battery cell according to the present disclosure and the cell stack according to the present disclosure can construct the redox flow battery capable of improving the battery performance. The redox flow battery according to the present disclosure can improve the battery performance.

[Description of Embodiments of Present Disclosure]

First, features of embodiments of the present disclosure are described below.

(1) One aspect of the present disclosure provides a battery cell for use in a redox flow battery, the battery cell including an electrode, a membrane facing one of both surfaces of the electrode, and a bipolar plate facing the other surface of the electrode, wherein the bipolar plate includes, in a surface thereof facing the electrode, a flow channel for an electrolyte, the electrode is a porous body containing carbon materials, and a compressive strain in a thickness direction of the electrode when a compressive stress of 0.8 MPa is applied in the thickness direction of the electrode is 20% or more and 60% or less.

The battery cell according to the present disclosure includes the above-mentioned specific electrode and hence can construct a redox flow battery (hereinafter also called an "RF battery") with higher battery performance than in the related art. The reasons are considered to reside in the following (a) and (b).

(a) The above-mentioned specific electrode is not too hard. Therefore, the electrode is easy to deform to some extent when the electrode is assembled into the RF battery and is subjected to a predetermined compressive stress. It is hence thought that a region of the electrode near its surface is deformed to come into close contact with the bipolar plate. With such close contact, contact resistance between the electrode and the bipolar plate can be reduced. Furthermore, the bipolar plate included in the battery cell according to the present disclosure has the flow channel in the form of, for example, a groove. Accordingly, it is thought that the electrode is deformed to project inward near an open end of the groove (the flow channel) in the bipolar plate and slightly enters the groove. Because part of the electrode slightly enters the groove, a porosity in a region of the electrode facing the groove is relatively increased from that in a region of the electrode facing a portion (rib portion described later) of the bipolar plate other than the groove. With the porosity relatively increasing, the region of the electrode facing the groove is easier to receive the unreacted electrolyte from the groove. Consequently, it is thought that the electrode is easy to secure a larger region (active region) where a battery reaction takes place and can satisfactorily develop the battery reaction. The battery cell including the above-mentioned specific electrode, according to the present disclosure, contributes to reducing cell resistance of the RF battery.

(b) The above-mentioned specific electrode is not too soft. It is hence thought that pores in the electrode formed of the porous body are less likely to be crushed and the electrolyte is easier to satisfactorily flow through the electrode with the presence of the pores. Moreover, it is thought that the electrode does not enter the groove (the flow channel) in the bipolar plate significantly, although being deformed. Thus, because the electrode does not enter the groove excessively, the bipolar plate can satisfactorily secure a flow space for the electrolyte in the groove and ensures high flowability of the electrolyte. The above-mentioned battery cell according to the present disclosure is less likely to cause a pressure rise (an increase in loss of pressure (hereinafter called "an increase of pressure loss")) in the cell caused by the above-mentioned excessive crush of the pores or the excessive intrusion of the electrode into the groove, and contributes to suppressing the increase of the pressure loss in the RF battery.

(2) In an exemplary embodiment of the battery cell according to the present disclosure, the flow channel may include a groove with a width of 0.6 mm or more and 5.0 mm or less.

The above-mentioned specific electrode slightly enters the above-mentioned specific groove but does not enter the groove excessively. Such an embodiment contributes to reducing the cell resistance of the RF battery and suppressing the increase of the pressure loss.

(3) In an exemplary embodiment of the battery cell according to the present disclosure, the flow channel may include a groove with a depth of 0.6 mm or more and 5.0 mm or less.

The above-mentioned specific electrode slightly enters the above-mentioned specific groove. The above-mentioned specific groove is easy to secure a flow space for the electrolyte even with the electrode having entered the groove. Such an embodiment contributes to reducing the cell resistance of the RF battery and suppressing the increase of the pressure loss.

(4) In an exemplary embodiment of the battery cell according to the present disclosure, the electrode may be carbon paper containing carbon fibers and carbon binder residue.

The above embodiment includes the electrode in which the carbon fibers are three-dimensionally bound together by the carbon binder residue. The carbon binder residue is generated with carbonization of a binder, such as resin, in a process of manufacturing the electrode. Rigidity of that type of electrode can be changed by adjusting an amount of the added binder. Therefore, the electrode has a higher degree of freedom in adjustment of the rigidity. Moreover, it is easy to reduce a thickness of the electrode because the electrode is compressed in the manufacturing process of the electrode. With the reduction of the thickness of the electrode, resistance related to conductivity can be reduced and the cell resistance is more apt to reduce. In addition, the electrode makes the electrolyte easier to flow therethrough with the presence of pores that are formed by three-dimensional binding of the carbon fibers. The embodiment including that type of electrode contributes to reducing the cell resistance of the RF battery and suppressing the increase of the pressure loss.

(5) In an exemplary embodiment of the battery cell according to the present disclosure, the electrode may be carbon paper containing carbon fibers, carbon binder residue, and carbon particles.

The above embodiment includes the electrode in which the carbon fibers are three-dimensionally bound together by the carbon binder residue. The embodiment including that type of electrode contributes to, for the reason described above, reducing the cell resistance of the RF battery and suppressing the increase of the pressure loss. In addition, because of containing the carbon particles, the electrode can satisfactorily develop the battery reaction with an increase of a surface area. Accordingly, the above embodiment contributes to further reducing the cell resistance of the RF battery.

(6) In an exemplary embodiment of the battery cell stated in above (5), a content of the carbon particles may be 10% by mass or more and 50% by mass or less.

The electrode included in the above embodiment can secure a large surface area and can satisfactorily develop the battery reaction. That type of electrode is less likely to impede a flow of the electrolyte in the electrode. The embodiment including that type of electrode contributes to further reducing the cell resistance of the RF battery while suppressing the increase of the pressure loss.

(7) In an exemplary embodiment of the battery cell according to the present disclosure, an initial thickness of the electrode may be 0.3 mm or more and 2.0 mm or less.

Here, the initial thickness of the electrode is a thickness of the electrode in a state in which a low compressive stress (0.7 kPa) is applied as described later. The electrode included in the above embodiment is easy to have a large surface area and can satisfactorily develop the battery reaction. Furthermore, that type of electrode is less likely to deteriorate a flow rate of the electrolyte in the electrode and has high flowability of the electrolyte. The embodiment including that type of electrode contributes to reducing the cell resistance of the RF battery and suppressing the increase of the pressure loss.

(8) In an exemplary embodiment of the battery cell according to the present disclosure, a bulk density of the electrode may be 0.11 $g/cm^3$ or more and 0.7 $g/cm^3$ or less.

The electrode included in the above embodiment is easy to have a large surface area and can satisfactorily develop the battery reaction. Furthermore, that type of electrode is less likely to deteriorate the flow rate of the electrolyte in the electrode and has high flowability of the electrolyte. The embodiment including that type of electrode contributes to reducing the cell resistance of the RF battery and suppressing the increase of the pressure loss.

(9) In an exemplary embodiment of the battery cell according to the present disclosure, a bulk density of the electrode may be different in a thickness direction of the electrode, and the bulk density may have a local maximal value in at least one of a near-surface region of the electrode on a side close to the membrane and a near-surface region of the electrode on a side close to the bipolar plate.

The electrode included in the above embodiment has a distribution of the bulk density in the thickness direction of the electrode, and the bulk density has the local maximal value in the near-surface region on the side close to the membrane or/and the near-surface region on the side close to the bipolar plate. The embodiment in which the bulk density has the local maximal value in the near-surface region on the side close to the membrane exhibits high reactivity between an active material in the electrolyte and the electrode. The embodiment in which the bulk density has the local maximal value in the near-surface region on the side close to the bipolar plate is easy to reduce the contact resistance between the electrode and the bipolar plate. Accordingly, any of those embodiments is easy to reduce the cell resistance of the RF battery. The bulk density may have the local maximal value in each of the near-surface regions.

(10) In an exemplary embodiment of the battery cell according to the present disclosure, a stiffness of the electrode may be 10 mN or more and 450 mN or less.

The electrode included in the above embodiment can be said as being neither too hard nor too soft. As a result of the combination of such a condition with the condition that the compressive strain of the electrode under the compressive stress of 0.8 MPa satisfies the above-mentioned specific range, the electrode slightly enters the groove in the bipolar plate but does not enter the groove excessively. The embodiment including that type of electrode not only can satisfactorily develop the battery reaction while ensuring high flowability of the electrolyte, but also contributes to reducing the cell resistance of the RF battery and suppressing the increase of the pressure loss.

(11) In an exemplary embodiment of the battery cell according to the present disclosure, the electrode may support thereon a catalyst made of a non-carbon material.

The electrode included in the above embodiment can more satisfactorily develop the battery reaction because of supporting the catalyst. The embodiment including that type of electrode contributes to further reducing the cell resistance of the RF battery.

(12) In an exemplary embodiment of the battery cell stated in above (11), the non-carbon material may be at least one type of material among oxides and carbides.

The electrode included in the above embodiment can more satisfactorily develop the battery reaction because of supporting the catalyst made of the above-mentioned specific material. The embodiment including that type of electrode contributes to further reducing the cell resistance of the RF battery.

(13) In an exemplary embodiment of the battery cell according to the present disclosure, the flow channel may include a set of grooves including a first groove formed relatively close to a supply edge of the bipolar plate and a second groove formed relatively close to a drainage edge of the bipolar plate, the first groove and the second groove being arrayed adjacent to each other.

The first groove in the above embodiment can be utilized to supply the electrolyte to the electrode. The second groove in the above embodiment can be utilized to drain the electrolyte. The bipolar plate including the above-mentioned specific set of grooves can satisfactorily supply the unreacted electrolyte to the electrode and drain the reacted electrolyte to the outside of the electrode. Furthermore, that type of bipolar plate includes a rib portion disposed between the adjacent grooves to partition those grooves. After receiving the unreacted electrolyte from the first groove, the electrode facing the bipolar plate can satisfactorily develop the battery reaction in a region facing the rib portion and can further drain the reacted electrolyte to the second groove. Therefore, the electrode can more satisfactorily develop the battery reaction. Hence the above embodiment contributes to further reduce the cell resistance of the RF battery while suppressing the increase of the pressure loss.

(14) In an exemplary embodiment of the battery cell according to the present disclosure, the flow channel may include a meandering groove.

The bipolar plate included in the above embodiment is easy to supply the electrolyte over a wider region of the electrode because of including the meandering groove. The embodiment including that type of bipolar plate is easy to secure the larger active region of the electrode and can more satisfactorily develop the battery reaction. Hence the above embodiment contributes to further reduce the cell resistance of the RF battery while suppressing the increase of the pressure loss.

(15) In an exemplary embodiment of the battery cell according to the present disclosure, a thickness of the membrane may be 7 μm or more and 60 μm or less.

The membrane included in the above embodiment is less susceptible to damage even upon receiving the predetermined compressive stress in a state assembled into the RF battery and is less likely to cause the increase of the cell resistance. Hence the above embodiment contributes to, in the RF battery, preventing the occurrence of a short circuit attributable to the damage of the membrane and reducing the cell resistance.

(16) In an exemplary embodiment of the battery cell according to the present disclosure, the membrane may be an ion-exchange membrane.

The membrane included in the above embodiment has high isolation between positive and negative electrolytes and high permeability of hydrogen ions (proton conductivity). The embodiment including that type of membrane can satisfactorily develop the battery reaction and contributes to reducing the cell resistance of the RF battery.

(17) In an exemplary embodiment of the battery cell stated in above (16), the ion-exchange membrane may be a fluorine-based cation exchange membrane containing a fluorine-based polyelectrolyte polymer with an ion-exchange group, the ion-exchange group may be a sulfonic acid, a cluster size of the ion-exchange group may be 2.5 nm or more, and grams of dry weight of the fluorine-based polyelectrolyte polymer per equivalent of the ion-exchange group may be 950 g/eq or less.

The membrane included in the above embodiment has high proton conductivity. The embodiment including that type of membrane contributes to increasing voltage efficiency of the RF battery. Furthermore, that type of membrane has high durability. The embodiment including that type of membrane contributes to, in the RF battery, preventing the occurrence of the short circuit attributable to the damage of the membrane and reducing the cell resistance.

(18) A cell stack according to an embodiment of the present disclosure includes:

the battery cell according to any one of above (1) to (17).

Because of including the battery cell according to the present disclosure, the cell stack according to the present disclosure can construct the RF battery with higher battery performance than the related art.

(19) A redox flow battery (RF battery) according to an embodiment of the present disclosure includes:

the battery cell stated in any one of above (1) to (17) or the cell stack stated in (18).

Because of including the battery cell according to the present disclosure or the cell stack according to the present disclosure, the RF battery according to the present disclosure has higher battery performance than the related art.

[Details of Embodiments of Present Disclosure]

A battery cell, a cell stack, and a redox flow battery (RF battery) according to embodiments of the present disclosure will be described below with reference to the drawings. In the drawings, the same reference sings denote the same components.

[Embodiments]

Figure 2:
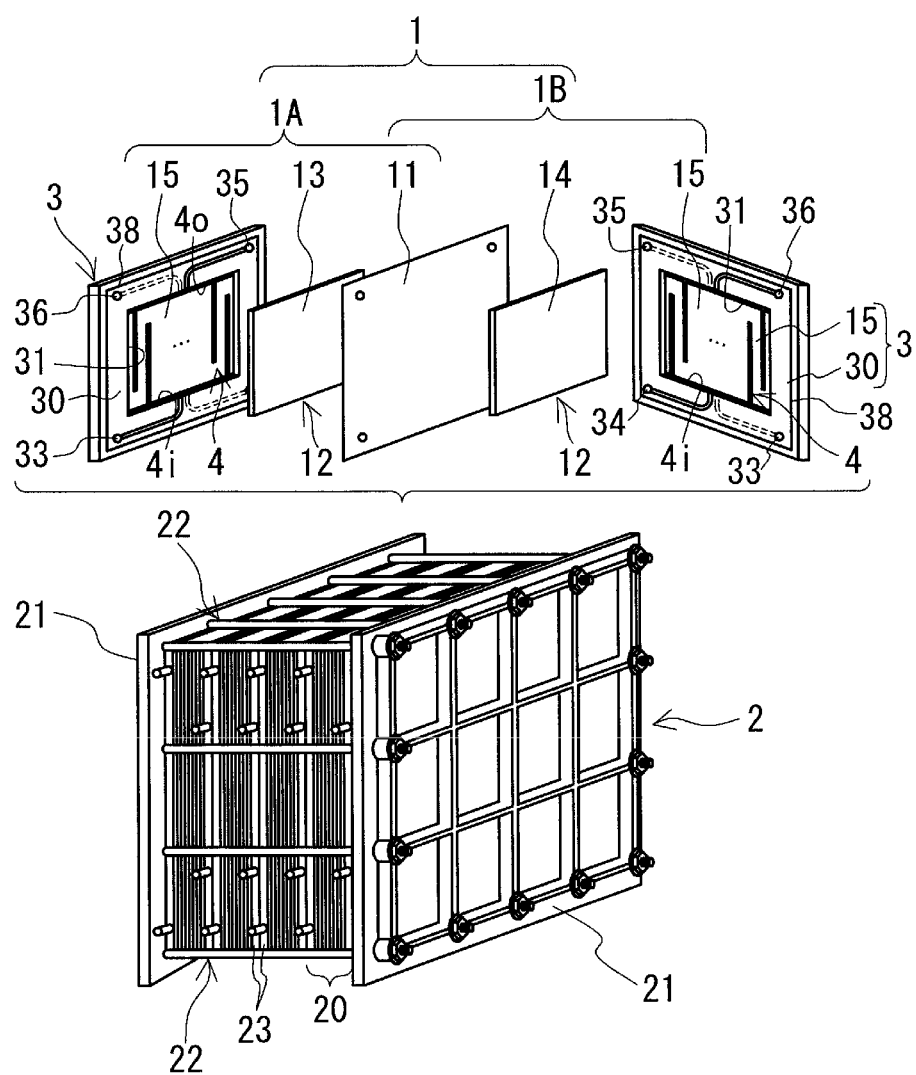
FIG. 2 schematically illustrates structures of a battery cell and a cell stack according to embodiments.

First, an overview of the battery cell 1, the cell stack 2, and the RF battery 10 according to the embodiments is given with reference to FIGS. 1 and 2. Thereafter, an electrode 12, a bipolar plate 15, and a membrane 11 equipped in the battery cell 1 according to the embodiment will be described in order. As explained later, one battery cell 1 includes, as the electrode 12, a positive electrode 13 and a negative electrode 14. In main part of the following description, the wording "electrode 12" is used as representing at least one of the positive electrode 13 and the negative electrode 14.

(Overview)

The battery cell 1 according to the embodiment includes the electrode 12, a membrane 11 facing one of both surfaces of the electrode 12, and the bipolar plate 15 facing the other surface of the electrode 12. The battery cell 1 is used as a main element of the RF battery 10. The electrode 12 is a porous body containing carbon materials. The bipolar plate 15 includes, in a surface thereof facing the electrode 12, a flow channel 4 (FIG. 2) for an electrolyte.

In particular, the electrode 12 equipped in the battery cell 1 according to the embodiment is neither too hard nor too soft from the qualitative point of view. From the quantitative point of view, a compressive strain in a thickness direction of the electrode 12 when a compressive stress of 0.8 MPa is applied in the thickness direction of the electrode 12 (hereinafter also expressed as the "compressive strain under the compressive stress of 0.8 MPa") is 20% or more and 60% or less. The cell stack 2 according to the embodiment includes the battery cell 1 according to the embodiment. The RF battery 10 according to the embodiment includes the battery cell 1 according to the embodiment or the cell stack 2 according to the embodiment.

(Battery Cell)

The battery cell 1 includes a positive cell 1A and a negative cell 1B. The positive cell 1A includes a positive electrode 13 (one example of the electrode 12), the membrane 11, and the bipolar plate 15. The negative cell 1B includes a negative electrode 14 (the other example of the electrode 12), the membrane 11, and the bipolar plate 15. When the RF battery 10 is a single-cell battery, the RF battery 10 includes one positive cell 1A and one negative cell 1B. When the RF battery 10 is a multiple-cell battery, the RF battery 10 includes multiple sets of the positive cells 1A and the negative cells 1B. The multiple-cell battery including the multiple sets of the positive cells 1A and the negative cells 1B typically includes the cell stack 2. The battery cell 1 is typically constructed by using a cell frame 3 described later.

(RF Battery)

The RF battery 10 is one of electrolyte-circulating storage batteries. The RF battery 10 includes the battery cell 1 (or the cell stack 2 instead) and a circulation mechanism for supplying the electrolyte to the battery cell 1. Typically, the RF battery 10 is connected to each of a power generation unit 7 and a load 8 with an intermediate apparatus 6 interposed therebetween. The intermediate apparatus 6 is, for example, an alternate current/direct current converter or a transformer facility. The power generation unit 7 is, for example, a solar photovoltaic power generator, a wind power generator, or any of other general power plants. The load 8 is, for example, a power system or electricity consumers. The RF battery 10 performs charge with the power generation unit 7 being a power supply source and discharge with the load 8 being a power supply target. The RF battery 10 is used for the purpose of, for example, leveling the load, compensating for a momentary voltage drop, providing an emergency power supply, or smoothing an output of natural energy power generation such as solar photovoltaic power generation or wind power generation.

<Circulation System>

The circulation system includes tanks 16 and 17, pipes 160 and 170 (including outgoing pipes 161 and 171 and return pipes 162 and 172), and pumps 18 and 19. The tank 16 stores a positive electrolyte that is supplied to the positive electrode 13 in a circulating manner. The outgoing pipe 161 and the return pipe 162 connect between the tank 16 and the positive cell 1A. The tank 17 stores a negative electrolyte that is supplied to the negative electrode 14 in a circulating manner. The outgoing pipe 171 and the return pipe 172 connect between the tank 17 and the negative cell 1B. The pumps 18 and 19 are connected to the outgoing pipes 161 and 171, respectively, and supply the electrolytes to the positive cell 1A and the negative cell 1B in a circulating manner. Black arrows in FIG. 1 indicate, by way of example, flows of the electrolytes.

<Electrolyte>

A solution containing an ion serving as an active material can be utilized as the electrolyte. A typical example of the electrolyte is an aqueous solution containing the above-mentioned ion and an acid. FIG. 1 illustrates, by way of example, an all-vanadium RF battery containing vanadium ions as positive and negative active materials. Another electrolyte with known composition, such as an electrolyte in a Mn—Ti RF battery which contains a manganese ion as the positive active material and a titanium ion as the negative active material, can also be utilized.

<Cell Frame>

The cell frame 3 includes the bipolar plate 15 and a frame body 30. The bipolar plate 15 is a conductive member that allows a current to pass therethrough and that is impermeable to the electrolyte. Because of including the flow channel 4 (FIG. 2) for the electrolyte, the bipolar plate 15 ensures high flowability of the electrolyte. The frame body 30 is an electrically insulating member that supports the bipolar plate 15 and that is utilized to supply the electrolyte to the electrode 12 disposed on the bipolar plate 15 and to drain the electrolyte from the electrode 12. In the cell frame 3 utilized in the single-cell battery or disposed at an end of the multiple-cell battery, the electrode 12 is disposed on one surface of the bipolar plate 15. In the cell frame 3 disposed in an intermediate portion of the multiple-cell battery, the positive electrode 13 is disposed on one of both surfaces of the bipolar plate 15, and the negative electrode 14 is disposed on the other surface of the relevant bipolar plate 15. Stated in another way, one set of the positive electrode 13 and the negative electrode 14 is disposed in a state of sandwiching one bipolar plate 15 therebetween from both the surfaces.

As illustrated in FIG. 2, the frame body 30 is disposed to cover a peripheral edge region of the bipolar plate 15. The frame body 30 includes a window portion 31 and supply and drainage channels through which the electrolyte is supplied and drained, respectively. The window portion 31 is formed in a central portion of the frame body 30 such that a region of the bipolar plate 15 where the electrode 12 is disposed is exposed. FIG. 2 illustrates, by way of example, the case in which the frame body 30 has a rectangular exterior shape and the window portion 31 has a rectangular shape. The exterior shape of the frame body 30 and the shape of the window portion 31 can be changed as appropriate.

Typically, the frame body 30 includes positive-side supply and drainage channels in one of both surfaces thereof, and negative-side supply and drainage channels in the other surface. The supply channels include liquid supply manifolds 33 (positive) and 34 (negative), slits extending from the liquid supply manifolds 33 and 34 to the window portion 31, and so on. The drainage channels include liquid drainage manifolds 35 (positive) and 36 (negative), slits extending from the window portion 31 to the liquid drainage manifolds 35 and 36, and so on. Part of a peripheral edge of the bipolar plate 15, the part being in contact with an inner peripheral edge of the frame body 30 to which the slit of the supply channel is opened, is utilized as an electrolyte supply edge 4i (see FIGS. 6A and 6B described later as well). Part of the peripheral edge of the bipolar plate 15, the part being in contact with an inner peripheral edge of the frame body 30 to which the slit of the drainage channel is opened, is utilized as an electrolyte drainage edge 4o (see FIGS. 6A and 6B described later as well). In addition, the frame body 30 in the illustrated example includes a sealing member 38 to hold the adjacent cell frames 3 in a liquid-tight state therebetween (FIG. 1).

A constituent material of the frame body 30 is a material with resistance to the electrolyte and electrical insulation, for example, resin such as a vinyl chloride resin. The frame body 30 is in the form of, for example, an assembly of split pieces. In such a case, the cell frame 3 can be manufactured by combining the split pieces into a form of sandwiching the bipolar plate 15 therebetween, and by joining the split pieces to each other as appropriate. Instead, the frame body 30 may be an integrally molded body that is formed by, for example, injection molding. In such a case, the cell frame 3 can be manufactured by molding the frame body 30 around the bipolar plate 15 with, for example, the injection molding.

(Cell Stack)

The cell stack 2 typically includes a layered body of the multiple battery cells 1, a pair of end plates 21, and fastening members 22. The layered body is constructed by stacking the positive cell 1A and the negative cell 1B in order. More specifically, the layered body includes the multiple cell frames 3 and is constructed by stacking the cell frame 3 (the bipolar plate 15), the positive electrode 13, the membrane 11, and the negative electrode 14 in order (see an exploded view of FIG. 2). The fastening members 22 may be each constituted by, for example, a coupling member, such as a long bolt, and a nut. The layered body between the end plates 21 is fastened by the fastening members 22. The layered body holds a layered state with fastening force applied in a stacking direction of the layered body. This fastening force causes a predetermined compressive stress to be loaded on the electrode 12 constituting each battery cell 1. In the RF battery 10, the battery cell 1 is used in such a loaded state.

As illustrated in FIG. 2, by way of example, the cell stack 2 may include multiple sub-cell stacks 20. Each of the sub-cell stacks 20 includes a layered body including a predetermined number of the battery cells 1, and a pair of supply/drainage plates 23 sandwiching the layered body therebetween. The above-mentioned pipes 160 and 170 are connected to the supply/drainage plates 23.

(Electrode)

The electrode 12 will be described in detail below with reference to FIGS. 3 to 5.

Figure 3A:
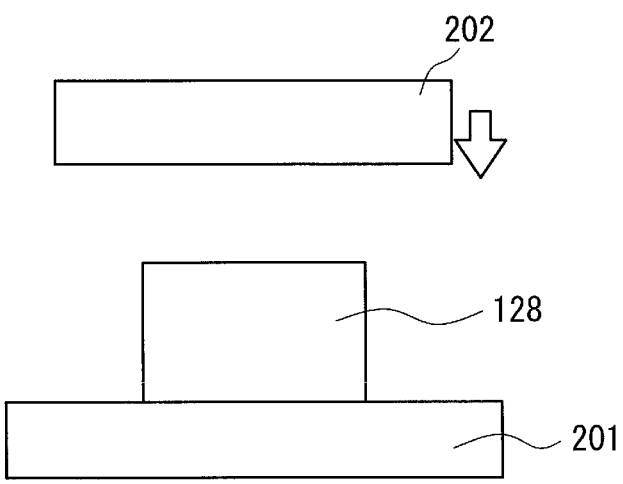
FIG. 3A is an explanatory view illustrating a method of measuring a compressive strain of an electrode under a compressive stress of 0.8 MPa, the view representing a state in which a measurement sample is placed on a fixed lower plate.
Figure 3B:
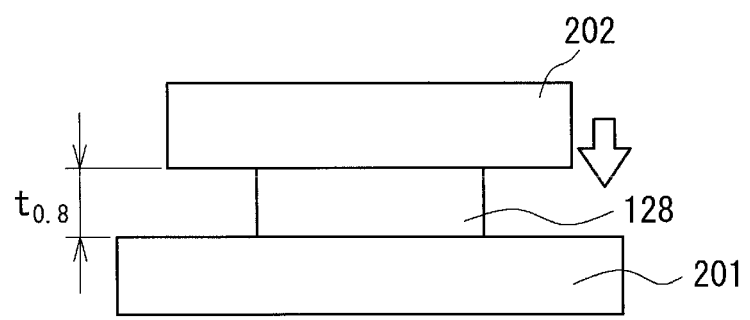
FIG. 3B is an explanatory view illustrating the method of measuring the compressive strain of the electrode under the compressive stress of 0.8 MPa, the view representing a state in which the measurement sample is compressed with a movable upper plate and the fixed lower plate.
Figure 3C:
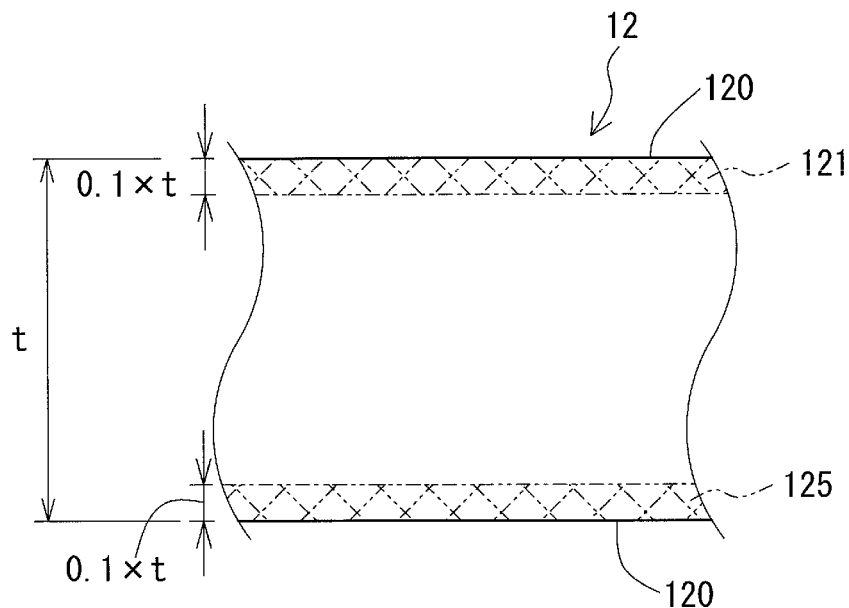
FIG. 3C is an explanatory view representing a distribution of bulk density in the electrode.

FIG. 3C illustrates a state when looking at, as a plan view, a surface of the electrode 12 parallel to a thickness direction thereof, namely at a lateral surface of the electrode 12 here. The lateral surface of the electrode 12 is a surface connecting one surface 120 of both surfaces of the electrode 12 facing the membrane 11 (an upper surface when viewed in the drawing sheet of FIG. 3C), and the other surface 120 of the electrode 12, namely the surface of the electrode 12 facing the bipolar plate 15, (a lower surface when viewed in the drawing sheet of FIG. 3C).

Figure 4:
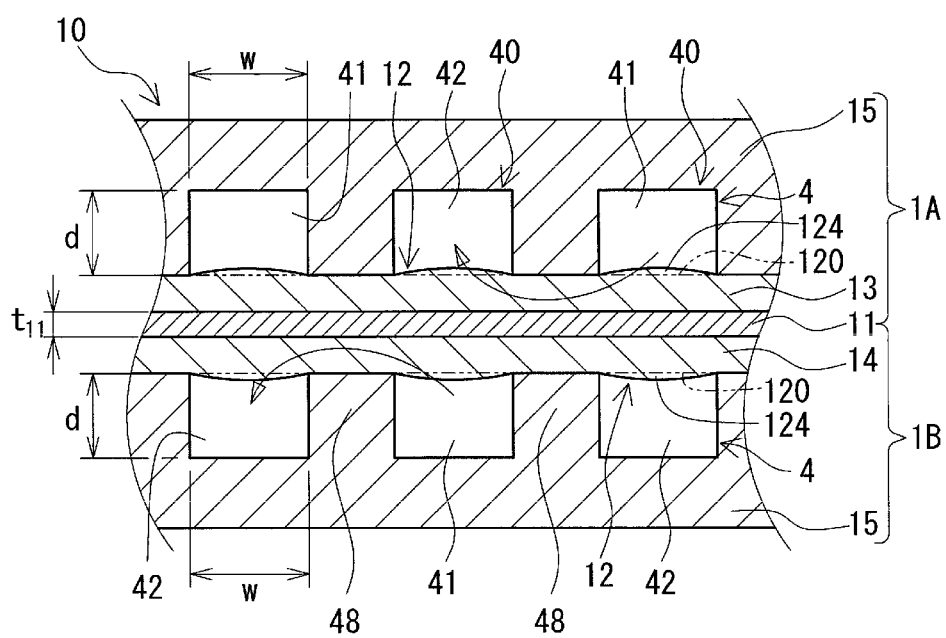
FIG. 4 is an explanatory sectional view illustrating an electrolyte flow state in the redox flow battery according to the embodiment.

FIG. 4 is a partial sectional view illustrating a single-cell battery (an example of the RF battery 10) including one positive cell 1A and one negative cell 1B in a state cut along a plane parallel to the stacking direction of the components. FIG. 4 schematically illustrates the membrane 11, the electrode 12, and the bipolar plate 15. Sizes (such as thicknesses) of those components are different from actual ones. A sectional view of the bipolar plate 15, illustrated in FIG. 4, corresponds to the case of cutting the bipolar plate 15 along a cut line (IV)-(IV) denoted in FIG. 6A.

Figure 5:
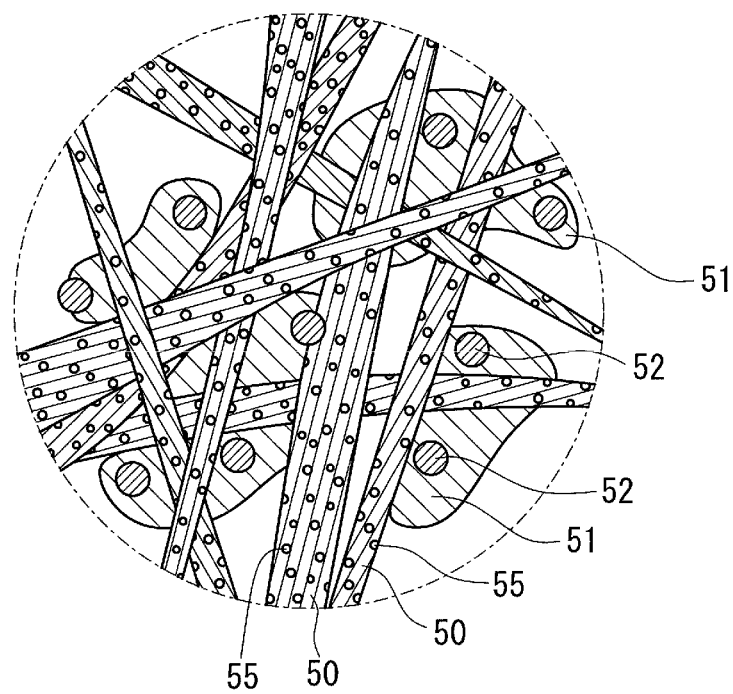
FIG. 5 is a schematic view illustrating texture of the electrode equipped in the battery cell according to the embodiment.

FIG. 5 is an enlarged view schematically illustrating texture of the electrode 12.

<Compressive Strain in Thickness Direction>

As described above, at least one electrode 12 between the positive electrode 13 and the negative electrode 14 equipped in the battery cell 1 according to the embodiment exhibits the compressive strain of 20% or more and 60% or less under the compressive stress of 0.8 MPa.

The above wording "compressive strain under the compressive stress of 0.8 MPa" is defined as a rate obtained by dividing a difference $(t_0-t_{0.8})$ between an initial thickness $t_0$ of the electrode 12 and a thickness of the electrode 12 when the compressive stress of 0.8 MPa is applied to the electrode 12 (hereinafter called a "thickness $t_{0.8}$") by the initial thickness $t_0$. In other words, the compressive strain is calculated from a formula of $\{(t_0-t_{0.8})/t_0\} \times 100$.

Methods of measuring the initial thickness $t_0$ and the thickness $t_{0.8}$ are described. The initial thickness $t_0$ of the electrode 12 is measured in conformity with the method A of Japan Industrial Standard JIS L 1096 (2010) (JIS method). More specifically, a thickness of the electrode 12 is measured with a commercially available thickness measuring device for a certain time under a constant pressure. The certain time is set to 10 sec. The constant pressure is set to 0.7 kPa. The measured thickness is obtained as the initial thickness $t_0$. The initial thickness $t_0$ and the thickness $t_{0.8}$ are each desirably to be measured on the electrode 12 before the electrode 12 is assembled into the RF battery 10.

The thickness $t_{0.8}$ is measured with a commercially available strength evaluating device as follows. The electrode 12 is cut into a piece with size of 10 mm×10 mm. The cut piece is used as a measurement sample 128 (FIG. 3A). The strength evaluating device includes, as illustrated in FIG. 3A, a fixed lower plate 201 and a movable upper plate 202. A size of each of surfaces of the fixed lower plate 201 and the movable upper plate 202, the surfaces coming into contact with the measurement sample 128, is set to be much larger than the size (10 mm×10 mm) of the measurement sample 128. The measurement sample 128 is placed on the fixed lower plate 201. As illustrated in FIG. 3B, the movable upper plate 202 is moved downward from above the measurement sample 128, and the measurement sample 128 is sandwiched between the fixed lower plate 201 and the movable upper plate 202. A position of the movable upper plate 202 is adjusted such that the pressure applied to the measurement sample 128 becomes 0.8 MPa. The measurement sample 128 is compressed by mainly applying the pressure from the movable upper plate 202. A thickness of the measurement sample 128 is measured in such a compressed state. The measured thickness is obtained as the thickness $t_{0.8}$.

When the above-mentioned compressive strain under the compressive stress of 0.8 MPa is 20% or more, the electrode 12 can be said as being not too hard. It is hence thought that the electrode 12 is easy to deform to some extent when the electrode 12 is assembled into the RF battery 10 and is subjected to a predetermined compressive stress. For example, it is thought that a region of the electrode 12 near the surface 120 (FIG. 4) is deformed to come into close contact with the bipolar plate 15, particularly with a rib portion 48 described later, and that contact resistance between the electrode 12 and the bipolar plate 15 can be reduced. Furthermore, the bipolar plate 15 has a groove 40 serving as the flow channel 4 for the electrolyte. It is hence thought that, as illustrated in FIG. 4, in the state assembled into the RF battery 10, the electrode 12 is deformed to project inward near an open end of the groove 40 and slightly enters the groove 40. In FIG. 4, the surface 120 before the deformation of the electrode 12 is imaginarily denoted by a two-dot-chain line. Moreover, in FIG. 4, a portion of the electrode 12 (projecting portion 124) projecting into the groove 40 from the surface 120 before the deformation is denoted by a solid line.

Because part of the electrode 12 slightly enters the groove 40 as described above, a porosity in a region of the electrode 12 facing the groove 40 is relatively increased in some cases from that in a region of the electrode 12 facing a portion of the bipolar plate 15 (rib portion 48) other than the groove 40. With the porosity relatively increasing, the region of the electrode 12 facing the groove 40 is easier to receive the unreacted electrolyte flowing through the groove 40. Consequently, it is thought that the electrode 12 is easy to secure a larger region (active region) where a battery reaction takes place and can satisfactorily develop the battery reaction. In other words, a utilization factor of the electrode 12 can be increased because the electrode 12 is not too hard. Thus, the battery cell 1 including that type of electrode 12 contributes to improving battery characteristics, for example, in point of reducing cell resistance of the RF battery 10.

When the above-mentioned compressive strain under the compressive stress of 0.8 MPa is 60% or less, the electrode 12 can be said as being not too soft. It is hence thought that the electrode 12 is not deformed excessively when the electrode 12 is assembled into the RF battery 10 and is subjected to the predetermined compressive stress. Accordingly, pores in the electrode 12 formed of the porous body are not crushed excessively. With the presence of the pores, the electrolyte is considered to be easy to satisfactorily flow through that type of electrode 12. Moreover, it is thought that, in the state assembled into the RF battery 10, the electrode 12 does not enter the groove 40 significantly, although being deformed, namely that the electrode 12 does not enter the groove 40 excessively. As a result, the groove 40 can satisfactorily secure a flow space for the electrolyte. The bipolar plate 15 can ensure high flowability of the electrolyte because the groove 40 can be satisfactorily utilized. The electrode 12 is less likely to cause a deterioration of flowability of the electrolyte attributable to the intrusion of the electrode 12 into the groove 40. In other words, the battery cell 1 has high flowability of the electrolyte because the electrode 12 is not too soft. Thus, the battery cell 1 including that type of electrode 12 contributes to improving the battery characteristics, for example, in point of suppressing an increase of pressure loss caused by the above-described excessive crush of the pores or the excessive intrusion of the electrode 12 into the groove 40.

The above-mentioned compressive strain under the compressive stress of 0.8 MPa may be 21% or more, 22% or more, or 25% or more. As the compressive strain increases, the electrode 12 is more apt to deform. Therefore, the electrode 12 is easy to further reduce the contact resistance with respect to the bipolar plate 15 and to slightly enter the groove 40. As a result, the RF battery 10 is easier to exhibit the effect of reducing the cell resistance.

The above-mentioned compressive strain under the compressive stress of 0.8 MPa may be 55% or less, 50% or less, or 45% or less. As the compressive strain decreases, the electrode 12 is less apt to deform. It is, therefore, easier to prevent the excessive crush of the pores in the electrode 12 or the excessive intrusion of the electrode 12 into the groove 40. As a result, the battery cell 1 has higher flowability of the electrolyte and is easy to further suppress the increase of the pressure loss in the RF battery 10. Desirably, the increase of the pressure loss is not generated substantially.

<Constituent Material>

The electrode 12 is the porous body containing the carbon materials and preferably contains the carbon materials as a main ingredient. Here, the term "main ingredient" implies that the content of the carbon materials is 95% by mass or more with respect to the electrode 12 being 100% by mass. That type of porous body is just required to be manufactured to satisfy the above-described condition that the compressive strain under the compressive stress of 0.8 MPa is 20% or more and 60% or less. The electrode 12 may be manufactured while adjusting, for example, the type, content, shape, size, bulk density, and stiffness (rigidity/flexibility) of the carbon materials.

The carbon materials are substantially constituted by a carbon element. The carbon materials may be, for example, carbon fibers 50, carbon binder residue 51, and carbon particles 52 (FIG. 5). Graphite fibers are regarded as one type of the carbon fibers 50.

<<Practical Example>>

A practical example of the electrode 12 may be carbon paper containing the carbon fibers 50 and the carbon binder residue 51. In that type of electrode 12, the carbon fibers 50 are three-dimensionally bound together by the carbon binder residue 51, thus forming a porous body.

The carbon binder residue 51 is generated with carbonization of a binder for binding the carbon fibers 50 by heat treatment in a process of manufacturing the electrode 12.

Examples of the binder may be materials containing a carbon element, typically various resins such as a phenol resin, for example.

Rigidity of the electrode 12 can be changed by adjusting an amount of the added binder. As the amount of the added binder increases, the rigidity of the electrode 12 is more apt to increase. Hence the electrode 12 is harder to deform. Accordingly, the electrode 12 can secure the pores and has higher flowability of the electrolyte. As the amount of the added binder decreases, the rigidity of the electrode 12 is more apt to reduce. Hence the electrode 12 is easier to deform. Accordingly, the electrode 12 is easier to form the above-mentioned projecting portion 124. That type of electrode 12 contributes to improving the battery characteristics of the RF battery 10, for example, in point of reducing the cell resistance and suppressing the increase of the pressure loss. Furthermore, that type of electrode 12 has a higher degree of freedom in adjustment of the rigidity and is more convenient to be used in practice. In addition, the thickness of the electrode 12 is reduced because the electrode 12 is compressed in the manufacturing process. With the reduction of the thickness of the electrode 12, resistance related to conductivity can be reduced and the cell resistance is more apt to reduce. From that point of view as well, the electrode 12 contributes to improving the battery characteristics of the RF battery 10. Note that the content of the carbon binder residue 51 depends on the amount of the added binder.

Another example of the electrode 12 may be carbon paper containing the carbon fibers 50, the carbon binder residue 51, and the carbon particles 52 (FIG. 5). Because of containing the carbon particles 52, that type of electrode 12 can increase a surface area of the electrode 12 in comparison with the above-described electrode 12 containing the carbon fibers 50 and the carbon binder residue 51. Accordingly, that type of electrode 12 contributes to more satisfactorily developing the battery reaction and further reducing the cell resistance of the RF battery 10. The carbon particles 52 may be, for example, carbon black or graphite particles.

An average particle size of the carbon black may be, for example, 4 nm or more and 500 nm or less. When the average particle size is 4 nm or more, the carbon black particles are hard to coagulate and are easy to disperse uniformly. With dispersion of the fine carbon particles 52, the electrode 12 is easy to increase the surface area. When the average particle size is 500 nm or less, the surface area of the electrode 12 can be satisfactorily increased. Thus, when the average particle size of the carbon black falls within the above-mentioned range, the electrode 12 can satisfactorily develop the battery reaction. As a result, the RF battery 10 is easy to exhibit the effect of reducing the cell resistance. The average particle size may be 5 nm or more and 495 nm or less, or 10 nm or more and 490 nm or less.

Resistance of the graphite particles against oxidation of the electrolyte is superior to that of the carbon black. Therefore, the graphite particles can be utilized for the electrolyte for which the carbon black is difficult to use. An average particle size of the graphite particles may be, for example, 1 µm or more and 50 µm or less. When the average particle size is 1 µm or more, the resistance of the graphite particles against the oxidizing power of the electrolyte can be satisfactorily developed. When the average particle size is 50 µm or less, the surface area of the electrode 12 can be satisfactorily increased. Thus, when the average particle size of the graphite particles falls within the above-mentioned range, the electrode 12 can satisfactorily develop the battery reaction. As a result, the RF battery 10 is easy to exhibit the effect of reducing the cell resistance. The average particle size may be 2 µm or more and 45 µm or less, or 3 µm or more and 40 µm or less.

The average particle size of the carbon particles 52 can be measured by, for example, a laser diffraction method. A commercially available measuring device, for example, a laser-diffraction particle distribution measuring device SALD-2300 made by Shimadzu Cooperation, can be utilized as a device of measuring the average particle size. A dispersion medium for use in measurement may be, for example, a mixed solution of diisooctyl sodium sulfosuccinate and pure water. The pure water is added such that a concentration of diisooctyl sodium sulfosuccinate in the dispersion medium becomes 0.2% by mass. Part of the carbon particles 52 is taken into a beaker and about 30 mL of the dispersion medium is added into the beaker. Dispersion treatment with irradiation (200 W) using a homogenizer is carried out on a mixed solution of the carbon particles 52 and the dispersion medium. A time for the irradiation using the homogenizer is set to 3 min. After the dispersion treatment, the average particle size of the carbon particles 52 is measured with the above-described measuring device.

The content of the carbon particles 52 may be, for example, 10% by mass or more and 50% by mass or less with respect to the electrode 12 being 100% by mass. When the content of the carbon particles 52 is 10% by mass or more, the surface area of the electrode 12 can be increased due to the carbon particles 52 and the electrode 12 can satisfactorily develop the battery reaction. When the content of the carbon particles 52 is 50% by mass or less, the carbon particles 52 are less likely to impede the flowability of the electrolyte. Accordingly, the electrode 12 has high flowability of the electrolyte. When the content of the carbon particles 52 is 13% by mass or more, 15% by mass or more, or 20% by mass or more, the electrode 12 is easy to further increase the surface area. In addition, the RF battery 10 is easy to further reduce the cell resistance. When the content of the carbon particles 52 is 48% by mass or less, 45% by mass or less, or 43% by mass or less, higher flowability of the electrolyte is obtained, and it is easy to further suppress the increase of the pressure loss.

<<Catalyst>>

The electrode 12 may support thereon a catalyst 55 made of a non-carbon material. The catalyst 55 is a substance exhibiting reaction activity with respect to an active material (ion) in the electrolyte. With addition of the catalyst 55, the electrode 12 can more satisfactorily develop the battery reaction.

Here, the non-carbon material is a material substantially not containing a graphite structure. The non-carbon material may be, for example, at least one type of material among oxides and carbides. Elements constituting the oxides and carbides may be, for example, metal elements and nonmetal elements listed below.

W (tungsten), Si (silicon), Ti (titanium), Ce (cerium), Mn (manganese), Fe (iron), Co (cobalt), Ni (nickel), Sn (tin), Mo (molybdenum), In (indium), Sb (antimony), Pb (lead), Bi (bismuth), Ta (tantalum), Nb (niobium), Ru (ruthenium), Ir (iridium), Pd (palladium), Rh (rhodium), Re (rhenium), Ba (barium), and so on.

Preferably, each of the oxides and the carbides contains one or two or more among the above-listed elements. The electrode 12 may support thereon the catalyst 55 made of one or more types of the oxides, the catalyst 55 made of one or more types of the carbides, or both of those catalysts 55. The electrode 12 containing the catalyst 55 made of the one or more non-carbon materials selected from the above-listed examples can more satisfactorily develop the battery reaction and is easier to exhibit the effect of reducing the cell resistance.

The catalyst 55 needs to be selected as a material that does not dissolve in the electrolyte in an operating voltage range of the RF battery 10. The catalyst 55 may have any size insofar as the above condition is satisfied. As the size of the catalyst 55 reduces, the surface area of the catalyst 55 itself increases. Thus, the catalyst 55 is desirably as small as possible from the viewpoint of the reaction activity. An amount of the catalyst 55 supported on the electrode 12 may be, for example, 1% by mass or more and 15% by mass or less with respect to the electrode 12 being 100% by mass.

<Thickness>

The initial thickness $t_0$ of the electrode 12 may be, for example, 0.3 mm or more and 2.0 mm or less. When the initial thickness $t_0$ is 0.3 mm or more, the electrode 12 has a large volume and is easy to have a large surface area. That type of electrode 12 can satisfactorily develop the battery reaction even in the state assembled into the RF battery 10 and receiving the predetermined compressive stress. When the initial thickness $t_0$ is 2.0 mm or less, the electrode 12 is not too thick even in the state assembled into the RF battery 10 and compressed upon receiving the predetermined compressive stress. That type of the electrode 12 is less likely to deteriorate a flow rate of the electrolyte in the electrode 12. The electrolyte at an appropriate flow rate enables the battery reaction to be developed satisfactorily. The reason is that the electrolyte is caused to spread over a wider region of the electrode 12. Furthermore, that type of electrode 12 has high flowability of the electrolyte. When the initial thickness $t_0$ is 0.33 mm or more, 0.35 mm or more, or 0.38 mm or more, the electrode 12 is easy to further increase the surface area. In addition, the RF battery 10 is easy to further reduce the cell resistance. When the initial thickness $t_0$ is 1.8 mm or less, 1.5 mm or less, or 1.3 mm or less, it is easy to further suppress the deterioration of the flow rate of the electrolyte. In addition, the RF battery 10 is easy to further reduce the cell resistance. Moreover, the electrode 12 with the thinner initial thickness $t_0$ has higher flowability of the electrolyte and hence is easy to further reduce the increase of the pressure loss.

<Bulk Density>

A bulk density of the electrode 12 may be, for example, 0.11 g/cm$^3$ or more and 0.7 g/cm$^3$ or less. Here, the bulk density is measured in a state in which no compressive stress is applied to the electrode 12 (hereinafter called an "uncompressed state"). When the bulk density is 0.11 g/cm$^3$ or more, the amount of the carbon materials is not too small. Therefore, the electrode 12 is easy to have a large surface area. That type of electrode 12 can satisfactorily develop the battery reaction. When the bulk density is 0.7 g/cm$^3$ or less, the amount of the carbon materials is not too large. That type of electrode 12 has high flowability of the electrolyte. Accordingly, the pressure loss in the electrode 12 is less likely to increase. When the bulk density is 0.15 g/cm$^3$ or more, 0.18 g/cm$^3$ or more, or 0.20 g/cm$^3$ or more, the electrode 12 is easy to further increase the surface area. In addition, the RF battery 10 is easy to further reduce the cell resistance. When the bulk density is 0.65 g/cm$^3$ or less, 0.60 g/cm$^3$ or less, or 0.57 g/cm$^3$ or less, the electrode 12 has higher flowability of the electrolyte and is easy to further reduce the increase of the pressure loss.

The bulk density of the electrode 12 may be uniform or may have a distribution. For example, the bulk density of the electrode 12 may be different in the thickness direction of the electrode 12. In such a case, the bulk density may have a local maximal value in at least one of a near-surface region 121 of the electrode 12 on a side close to the membrane 11 and a near-surface region 125 of the electrode 12 on a side close to the bipolar plate 15 (FIG. 3C). The near-surface regions 121 and 125 of the electrode 12 are each defined as a region ranging from the surface 120 of the electrode 12 to a position corresponding to 10% of the thickness t of the electrode 12 under the uncompressed state. In FIG. 3C, the near-surface regions 121 and 125 are imaginarily indicated by cross-hatching those regions 121 and 125 with two-dot-chain lines. The surface 120 of the electrode 12 is the surface facing the membrane 11 or the bipolar plate 15.

The electrode 12 including, in the near-surface region 121 on the side close to the membrane 11, a portion where the bulk density is locally high exhibits higher reactivity with the active material in the electrolyte. That type of electrode 12 is easy to reduce the cell resistance of the RF battery 10. Furthermore, in that type of electrode 12, since the bulk density in a region on a side near the bipolar plate 15 is relatively low, the flowability of the electrolyte is relatively high in the region on the side near the bipolar plate 15. Therefore, the electrolyte can be satisfactorily supplied and drained between the region of the electrode 12 on the side near the bipolar plate 15 and the flow channel 4 in the bipolar plate 15. That type of electrode 12 can be said as having higher flowability of the electrolyte. The electrode 12 including, in the near-surface region 125 on the side close to the bipolar plate 15, a portion where the bulk density is locally high is easy to reduce the contact resistance with respect to the bipolar plate 15. That type of electrode 12 is easy to reduce the cell resistance of the RF battery 10. The electrode 12 including, in both the near-surface regions 121 and 125, the portions where the bulk density is locally high is easy to even further reduce the cell resistance of the RF battery 10.

When the electrode 12 with the above-described distribution of the bulk density contains, for example, the carbon fibers 50, the carbon binder residue 51, and the carbon particles 52, the electrode 12 may be manufactured, for example, as follows. First, a suspension described below is applied to an aggregate of the carbon fibers 50. The suspension is a liquid prepared by dissolving and dispersing a binder resin before carbonization and the carbon particles 52 into a solvent and so on. The suspension is advantageously to be applied by, for example, coating, dipping, or spray application.

After applying the suspension, the aggregate is dried to volatilize the solvent. After obtaining a material (hereinafter called an "electrode precursor") from which the solvent has been volatilized, only surface layers of the electrode precursor are dipped into the suspension again. Then, the electrode precursor is dried to volatilize the solvent. The electrode 12 with the bulk density having the local maximal value in the near-surface regions 121 and 125 of the surfaces 120 can be obtained by performing one or more times the above-described process of applying the suspension to the surface layers (or dipping the surface layers in the suspension), and then drying and volatilizing the suspension.

The distribution of the bulk density in the electrode 12 may be measured, for example, as follows.

(1) Determine the porosity of the electrode 12.

The porosity is measured, for example, by obtaining an X-ray-CT three-dimensional image with a commercially available three-dimensional image analyzer, and by analyzing the obtained three-dimensional image. In the three-dimensional image, the electrode 12 is divided into 10 equal parts in the thickness direction from the surface 120, thus dividing the electrode 12 into 10 regions. A thickness of each of those regions is 10% of the thickness t of the electrode 12. A porosity P of each region is then determined.

The porosity P (%) may be determined by analyzing the three-dimensional image.

A basic formula may be $P=\{$(total volume of each region−volume of the carbon materials constituting each region)/total volume of each region$\}\times 100$.

(2) Convert the porosity to the bulk density.

Conversion to the bulk density B is made using the above-mentioned porosity P of each region and a true density d of the electrode 12. The true density d may be determined by, for example, a pycnometer method.

The bulk density $B$ (g/cm$^3$) is calculated from a formula of $B=d\times(1-P/100)$.

(3) Determine a local maximal value of the bulk density.

The bulk densities B of the 10 regions obtained by dividing the electrode 12 in the thickness direction of the electrode 12 are compared to check whether the bulk density B of each of the near-surface regions 121 and 125 takes a local maximal value.

<Stiffness>

A stiffness of the electrode 12 may be, for example, 10 mN or more and 450 mN or less. When the stiffness is 10 mN or more, the electrode 12 is not too soft. Therefore, the electrode 12 is rather hard to deform as a result of the combination with the above-described condition that the compressive strain under the compressive stress of 0.8 MPa is 60% or less. Hence it is easy to further prevent the pores in the electrode 12 from being crushed excessively. Moreover, that type of electrode 12 does not enter the groove 40 in the bipolar plate 15 excessively. As a result, the electrode 12 is easy to suppress the deterioration of the flowability of the electrolyte attributable to the intrusion of the electrode 12 into the groove 40. When the stiffness is 450 mN or less, the electrode 12 is not too hard. Therefore, the electrode 12 is rather easy to deform as a result of the combination with the above-described condition that the compressive strain under the compressive stress of 0.8 MPa is 20% or more. Hence the region of the electrode 12 near the surface 120 is easy to closely contact with the bipolar plate 15. By closely contacting with the bipolar plate 15, the electrode 12 is easy to further reduce the contact resistance with respect to the bipolar plate 15. In addition, since the electrode 12 slightly enters the groove 40 in the bipolar plate 15 as described above, the electrode 12 can satisfactorily develop the battery reaction. When the stiffness is 15 mN or more, 20 mN or more, or 25 mN or more, higher flowability of the electrolyte is obtained, and it is easy to further reduce the increase of the pressure loss. When the stiffness is 430 mN or less, 400 mN or less, or 380 mN or less, it is easy to further reduce the cell resistance of the RF battery 10.

The stiffness of the electrode 12 is measured using, for example, a Gurley stiffness tester in conformity with JIS L 1096 (2010). A commercially available measuring device may be utilized as appropriate to measure the stiffness.

(Bipolar Plate)

The bipolar plate 15 will be described in detail below with reference to mainly FIGS. 6A and 6B.

Figure 6A:
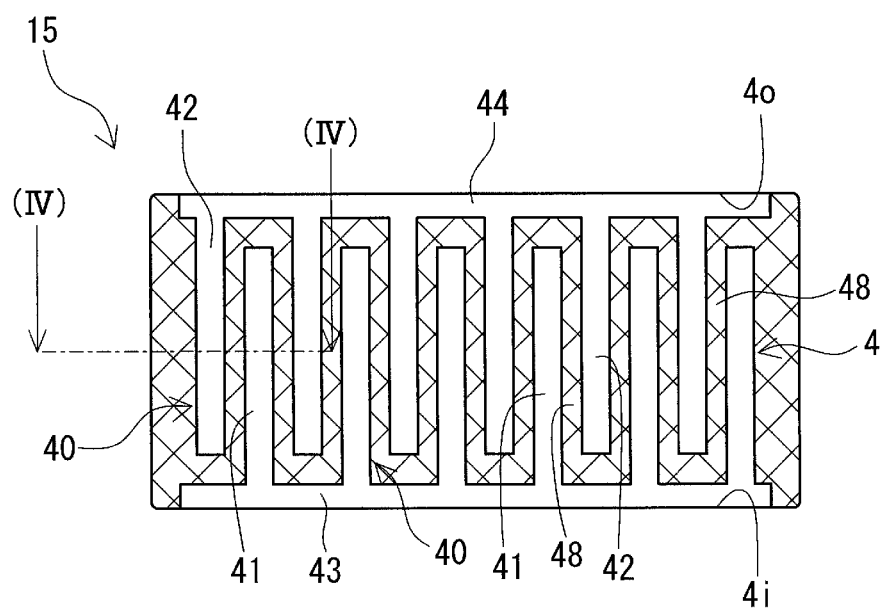
FIG. 6A is a partial plan view illustrating an example of a bipolar plate equipped in the battery cell according to the embodiment.
Figure 6B:
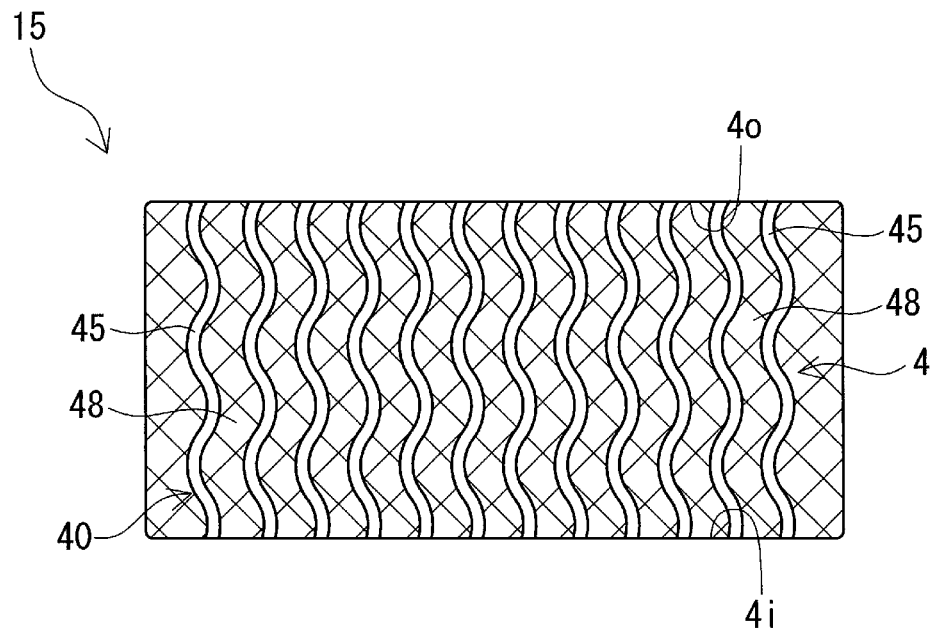
FIG. 6B is a partial plan view illustrating another example of the bipolar plate equipped in the battery cell according to the embodiment.

FIGS. 6A and 6B are each a plan view illustrating only a region of the bipolar plate 15 (hereinafter called an "exposed region") which is exposed in the window portion 31 (FIG. 2) of the cell frame 3, while a peripheral edge region of the bipolar plate 15 covered with the frame body 30 is omitted. The electrode 12 is disposed in the exposed region.

In the following description, part of a peripheral edge of the exposed region of the bipolar plate 15, the part being utilized to supply the electrolyte from an inner peripheral edge of the window portion 31 of the cell frame 3, is called a supply edge 4i of the bipolar plate 15. Part of the peripheral edge of the exposed region, the part being utilized to drain the electrolyte toward an inner peripheral edge of the window portion 31 of the cell frame 3, is called a drainage edge 4o of the bipolar plate 15.

FIGS. 6A and 6B illustrate, by way of example, the case in which a plan shape of the exposed region of the bipolar plate 15 is rectangular. Furthermore, FIGS. 6A and 6B illustrate, by way of example, the case in which parts of the peripheral edge of the exposed region, the parts forming two facing sides (long sides here) of the rectangular shape, are utilized as the supply edge 4i and the drainage edge 4o in a one-to-one relationship. A flow direction of the electrolyte in the bipolar plate 15 is set to a direction from a lower side to an upper side along an up-down direction of the drawing sheet in FIGS. 6A and 6B. When the supply edge 4i and the drainage edge 4o are facing long sides of a rectangle as in the illustrated example, the flow direction of the electrolyte may be a direction of a straight line with a shortest distance between both the edges, namely a direction of short sides here. The wording "flow direction of the electrolyte" implies a basic flow direction of the electrolyte and is not always a direction along the shape of the flow channel 4. The plan shape of the exposed region, positions at which the supply edge 4i and the drainage edge 4o are arranged, the flow direction of the electrolyte, and so on can be changed as appropriate.

<Flow Channel>

The structure in which the bipolar plate 15 includes the flow channel 4 for the electrolyte in its surface facing the electrode 12 is preferable in point of that the RF battery 10 with high flowability of the electrolyte can be constructed. The flow channel 4 may include, for example, the groove 40 that is opened to a surface of the bipolar plate 15, the surface being positioned to face the electrode 12. When the RF battery 10 is constructed by using the above-mentioned specific electrode 12 that is neither too hard nor too soft and the bipolar plate 15 including the groove 40, the electrode 12 slightly projects inward near the open end of the groove 40 as described above, but the electrode 12 does not entirely close the groove 40 (see FIG. 4 as well). Accordingly, the groove 40 can secure the flow space for the electrolyte. That type of RF battery 10 can satisfactorily develop the battery reaction while ensuring high flowability of the electrolyte with the provision of the flow channel 4 in the form of the groove 40.

<<Shape>>

The groove 40 may be formed, for example, to linearly extend along the flow direction of the electrolyte and to have a rectangular plan shape (like grooves 41 and 42 in FIG. 6A). Instead, the plan shape of the groove 40 may be, for example, a curved waveform, a zigzag form (triangular waveform), a rectangular waveform, or a sawtooth waveform (right-angled triangular waveform). FIG. 6B illustrates, by way of example, a meandering groove 45 in the curved waveform. The groove 40 may be continuously formed from a side close to the supply edge 4i toward a side close to the drainage edge 4o (for example, the grooves 41 and 42 and the meandering groove 45). Furthermore, the groove 40 may be formed in a shape opened at one end and closed at the other end (for example, the grooves 41 and 42), or a shape opened at both ends (for example, the meandering groove 45).

When the flow channel 4 includes the multiple grooves 40 arrayed at predetermined intervals in an extending direction of the supply edge 4i (or the drainage edge 4o) (FIGS. 6A and 6B), higher flowability of the electrolyte is obtained. Moreover, the electrode 12 facing the bipolar plate 15 provided with that type of flow channel 4 can satisfactorily develop the battery reaction. The reason is that, because the rib portion 48 is formed between the adjacent grooves 40, the electrode 12 can secure, as the active region, its region facing the rib portion 48 (see FIG. 4 as well). When the adjacent grooves 40 have the same shape and the same size as in the illustrated example, the multiple rib portions 48 are present at the predetermined intervals in the above-described extending direction. Particularly, when the multiple grooves 40 are formed at equal intervals in the above-described extending direction, the multiple rib portions 48 are also present at the equal intervals. With the presence of the rib portions 48, the electrode 12 is easy to secure the large active region and can satisfactorily develop the battery reaction. The above-mentioned intervals may not need to be equal intervals. In FIGS. 6A and 6B, the rib portion 48 is denoted by cross-hatching for easier understanding.

When the flow channel 4 includes the multiple grooves 40, the flow channel 4 may include, for example, a set of grooves 40 including a first groove 41 formed relatively close to the supply edge 4i of the bipolar plate 15 and a second groove 42 formed relatively close to the drainage edge 4o of the bipolar plate 15, the first groove 41 and the second groove 42 being arrayed adjacent to each other (FIG. 6A).

The groove 41 relatively close to the supply edge 4i of the bipolar plate 15 may have, for example, the form described below. For the groove 42 of the bipolar plate 15 relatively close to the drainage edge 4o, the following description is similarly applied by reading the groove 41 as the "groove 42", the supply edge 4i as the "drainage edge 4o", and the drainage edge 4o as the "supply edge 4i". When the bipolar plate 15 includes straightening grooves 43 and 44 described later, it is just needed to read the supply edge 4i as the "straightening groove 43" and the drainage edge 4o as the "straightening groove 44".

(A) One end of the groove 41 is opened to the supply edge 4i, and the other end is closed at the drainage edge 4o.

(B) Both ends of the groove 41 are not opened to the supply edge 4i and the drainage edge 4o. In addition, comparing a distance L1 from the one end of the groove 41 to the supply edge 4i and a distance L2 from the other end of the groove 41 to the drainage edge 4o, the distance L1 on a side close to the supply edge 4i is shorter than the distance L2.

The first groove 41 is positioned near the supply edge 4i or opened to the supply edge 4i. Therefore, when the electrolyte is supplied from the frame body 30 of the cell frame 3, the first groove 41 is easy to supply the electrolyte to the electrode 12 disposed in the exposed region of the bipolar plate 15. That type of first groove 41 can be considered to be easily utilized to supply the electrolyte to the electrode 12. The second groove 42 is positioned near the drainage edge 4o or opened to the drainage edge 4o. Therefore, the second groove 42 is easy to drain the electrolyte to the frame body 30 from the electrode 12. That type of second groove 42 can be considered to be easily utilized to drain the electrolyte from the electrode 12. The bipolar plate 15 including the set of the above-described grooves 41 and 42 can satisfactorily supply the unreacted electrolyte to the electrode 12 and is easy to drain the reacted electrolyte from the electrode 12 to the outside of the electrode 12. In addition, by constructing the RF battery 10 with use of the bipolar plate 15 and the electrode 12 described above, the grooves 41 and 42 can secure the flow space for the electrolyte although the electrode 12 projects inward near open ends of the grooves 41 and 42 as described above. As a result, the RF battery 10 can satisfactorily develop the battery reaction, is easy to reduce the cell resistance, has high flowability of the electrolyte, and is easy to reduce the increase of the pressure loss.

Furthermore, the bipolar plate 15 includes, between the first groove 41 and the second groove 42 adjacent to each other, the rib portion 48 partitioning the grooves 41 and 42. Therefore, the electrode 12 can secure, as the active region, its region facing the rib portion 48 and can satisfactorily develop the battery reaction. In particular, after receiving the electrolyte from the first groove 41, the electrode 12 can satisfactorily develop the battery reaction in the region facing the rib portion 48 and can drain the reacted electrolyte to the second groove 42. In the RF battery 10 including the bipolar plate 15 and the electrode 12 described above, as denoted by empty arrows in FIG. 4, the electrolyte can be caused to flow from the first groove 41 in the bipolar plate 15 to the adjacent second groove 42 via routes of overriding the rib portion 48 and passing through part of the electrode 12. That type of RF battery 10 can more satisfactorily develop the battery reaction and is easy to reduce the cell resistance. In addition, that type of RF battery 10 has higher flowability of the electrolyte and hence is easy to further suppress the increase of the pressure loss.

As described above, the first groove 41 and the second groove 42 illustrated, by way of example, in FIG. 6A has the following features:

(a) each groove is a linear groove extending in the flow direction of the electrolyte, (b) both the grooves have the same shape and the same size, and (c) the grooves are adjacently arrayed at equal intervals in the extending direction of the supply edge 4i (or the drainage edge 4o). In other words, the first groove 41 and the second groove 42 are alternately arrayed side by side. Furthermore, the first groove 41, the rib portion 48, and the second groove 42 are repeatedly arrayed in order.

Moreover, the bipolar plate 15 illustrated, by way of example, in FIG. 6A includes multiple sets of the first grooves 41 and the second grooves 42. In that type of bipolar plate 15, the multiple first grooves 41 are arrayed at predetermined intervals in the above-described extending direction, and the multiple second grooves 42 are also arrayed at predetermined intervals in the above-described extending direction. In addition, the second groove 42 is disposed between the adjacent first grooves 41. The grooves 41 in a group of the first grooves 41 and the grooves 42 in a group of the second groove 42 are arranged to mesh with each other. Thus, the bipolar plate 15 includes the grooves 40 that are arranged in an interdigital state or in the form of facing comb teeth. The RF battery 10 including the bipolar plate 15 provided with the above-described flow channel 4 is easy to further contribute to reducing the cell resistance and suppressing the increase of the pressure loss.

When the flow channel 4 includes the meandering groove 45 (FIG. 6B), the bipolar plate 15 can supply the electrolyte over a wider region of the electrode 12 than the above-described bipolar plate including the linear groove. The electrode 12 can utilize, as the active region, a region around a portion of the electrode 12 facing the meandering groove 45. Therefore, the electrode 12 is easy to secure the larger region where the battery reaction takes place, and can more satisfactorily develop the battery reaction. The bipolar plate 15 illustrated, by way of example, in FIG. 6B includes the multiple meandering grooves 45. Both ends of each meandering groove 45 are opened to the supply edge 4i and the drainage edge 4o in a one-to-one relationship. In addition, each meandering groove 45 satisfies the above-described conditions (b) and (c). The RF battery 10 including the bipolar plate 15 provided with the above-described flow channel 4 can more satisfactorily develop the battery reaction and is easy to further reduce the cell resistance. Moreover, that type of RF battery 10 has high flowability of the electrolyte and hence is easy to suppress the increase of the pressure loss.

<<Rectifying Part>>

When the flow channel 4 includes the multiple grooves 40 arrayed in the extending direction of the supply edge 4i or the drainage edge 4o, the flow channel 4 may include at least one of the rectifying part 43 disposed to extend along the extending direction of the supply edge 4i and the rectifying part 44 disposed to extend along the extending direction of the drainage edge 4o. FIG. 6A illustrates, by way of example, the case including the rectifying parts 43 and 44. FIG. 6B illustrates, by way of example, the case not including the rectifying parts 43 and 44. With the provision of the rectifying part 43 on a side close to the supply edge 4i, the electrolyte supplied from the frame body 30 of the cell frame 3 can be easily dispersed along the supply edge 4i to uniformly flow into the multiple grooves 40 (the grooves 41 in FIG. 6A) that extend from the rectifying part 43. With the provision of the rectifying part 44 on a side close to the drainage edge 4o, the electrolyte flowing out from the individual grooves 40 (the grooves 42 in FIG. 6A) connected to the rectifying part 44 can be easily drained to the frame body 30.

When the bipolar plate 15 does not include the rectifying parts 43 and 44, the frame body 30 may include a rectifying part (not illustrated) along the inner peripheral edge of the window portion 31.

<<Groove Width>>

The flow channel 4 may include the groove 40 with a width w (FIG. 4) of 0.6 mm or more and 5.0 mm or less. Here, the width w of the groove 40 is defined as a length of the open end of the groove 40 taken in a cross-section of the groove 40 cut along a plane that is perpendicular to the flow direction of the electrolyte following the shape of the groove 40. As illustrated in FIG. 4, by way of example, when the groove 40 has a rectangular sectional shape and a parallelepiped inner space, the width w is uniform over the entire length of the groove 40.

When the width w of the groove 40 is 0.6 mm or more, the electrode 12 is easy to slightly enter the groove 40 near the open end with reliability. Therefore, the electrode 12 can satisfactorily develop the battery reaction. Furthermore, the groove 40 is not too narrow and the flowability of the electrolyte is high. When the width w of the groove 40 is 5.0 mm or less, the electrode 12 is prevented from entering the groove 40 excessively. Therefore, the groove 40 can secure the flow space for the electrolyte, and the RF battery 10 with high flowability of the electrolyte can be constructed. When the width w is 0.8 mm or more, 1.0 mm or more, or 1.2 mm or more, the electrode 12 can more satisfactorily develop the battery reaction and can ensure higher flowability of the electrolyte. When the width w is 4.5 mm or less, 4.0 mm or less, or 3.5 mm or less, the electrode 12 has higher flowability of the electrolyte and is easy to further reduce the increase of the pressure loss.

<<Groove Depth>>

The flow channel 4 may include the groove 40 with a depth d (FIG. 4) of 0.6 mm or more and 5.0 mm or less. Here, the depth d of the groove 40 is defined as a maximum distance from the open end of the groove 40 to a bottom surface of the groove 40 along the thickness direction of the bipolar plate 15 taken in the cross-section of the groove 40 cut along the plane that is perpendicular to the flow direction of the electrolyte following the shape of the groove 40. As illustrated in FIG. 4, by way of example, when the groove 40 has the rectangular sectional shape and the parallelepiped inner space, the depth d is uniform over the entire length and the entire width of the groove 40.

When the depth d of the groove 40 is 0.6 mm or more, the flow space for the electrolyte is easily secured even when the electrode 12 has slightly entered the groove 40, and the RF battery 10 with high flowability of the electrolyte can be constructed. When the depth d of the groove 40 is 5.0 mm or less, the electrode 12 can slightly enter the groove 40 near the open end and can satisfactorily develop the battery reaction. Accordingly, the RF battery 10 is easy to reduce the cell resistance. When the depth d is 0.8 mm or more, 1.0 mm or more, or 1.2 mm or more, the electrode 12 has higher flowability of the electrolyte and is easy to further reduce the increase of the pressure loss. When the depth d is 4.5 mm or less, 4.0 mm or less, or 3.5 mm or less, the electrode 12 can more satisfactorily develop the battery reaction, and a thickness of the bipolar plate 15 can be reduced.

<<Conditions of Width and Depth>>

The flow channel 4 satisfies at least one of conditions (1) and (2) described below. Preferably, the flow channel 4 satisfies both the following conditions (1) and (2). When the flow channel 4 includes the multiple grooves 40, all the grooves 40 preferably satisfy the following conditions (1) and (2).

(1) In a region of one groove 40 occupying 50% or more of an entire length thereof, the groove 40 has the width w of a uniform size, and the width w satisfies a range of 0.6 mm or more and 5.0 mm or less. Preferably, in a region of one groove 40 occupying 80% or more of the entire length, or in a region of the one groove 40 occupying the entire length, the groove 40 has the width w of a uniform size, and the width w satisfies the above-mentioned range. FIGS. 6A and 6B illustrate, by way of example, the case in which each of the grooves 41 and 42 and the meandering groove 45 has the width w of a uniform size over the entire length.

(2) In a region of one groove 40 occupying 50% or more of the entire length, the groove 40 has the depth d of a uniform size, and the depth d satisfies a range of 0.6 mm or more and 5.0 mm or less. Preferably, in a region of one groove 40 occupying 80% or more of the entire length, or in a region of the one groove 40 occupying the entire length, the groove 40 has the depth d of a uniform size, and the depth d satisfies the above-mentioned range.

<<Interval Between Grooves>>

When the flow channel 4 includes the multiple grooves 40 arrayed in parallel, a minimum interval between adjacent two of the grooves 40 may be, for example, ½ time or more the groove width w and 7 times or less the groove width w. The minimum interval corresponds to a width of the rib portion 48. FIG. 6A illustrates, by way of example, the case including, between the grooves 41 and 42, the rib portion 48 that has a rectangular shape and a uniform width. FIG. 6B illustrates, by way of example, the case including, between the meandering grooves 45 adjacent to each other, the rib portion 48 that has a wavy shape and a uniform width.

When the above-mentioned minimum interval is ½ time or more the groove width w, the rib portion 48 can be secured. Therefore, the electrode 12 can satisfactorily develop the battery reaction. In addition, the RF battery 10 is easy to reduce the cell resistance. When the above-mentioned minimum interval is 7 times or less the groove width w, a larger number of the grooves 40 can be formed. Therefore, the RF battery 10 has high flowability of the electrolyte and is easy to reduce the increase of the pressure loss.

<<Number of Grooves>>

When the flow channel 4 includes the grooves 40, the number of the grooves 40 can be selected as appropriate. When the number of the grooves 40 is relatively large, high flowability of the electrolyte is obtained and the RF battery 10 is easy to reduce the increase of the pressure loss. When the number of the grooves 40 is relatively small, the rib portion 48 is easy to be formed in a secure manner. Therefore, the electrode 12 can satisfactorily develop the battery reaction, and the RF battery 10 is easy to reduce the cell resistance.

<<Sectional Shape of Groove>>

A sectional shape of the groove 40 can be selected as appropriate. Although FIG. 4 illustrates, by way of example, the case in which the sectional shape of the groove 40 is rectangular, the sectional shape may be V-like, semicircular, and so on. Here, the sectional shape of the groove 40 implies a shape taken in the cross-section of the groove 40 cut along a plane that is perpendicular to the flow direction of the electrolyte following the shape of the groove 40.

<<Material Composition>>

A material composition of the bipolar plate 15 may be, for example, an organic complex material such as the so-called conductive plastic. The organic complex material may contain, for example, a conductive material such as a carbonaceous material or a metal, and an organic material such as a thermoplastic resin. The bipolar plate 15 is advantageously to be formed into a plate-like shape by, for example, a known method. A method of shaping the conductive plastic may be, for example, injection molding, press molding, or vacuum molding. In the bipolar plate 15 including the flow channel 4, the flow channel 4 may also be formed, for example, at the same time as forming the bipolar plate 15 into the plate-like shape. Instead, the flow channel 4 may be formed, for example, by cutting a flat plate material.

(Membrane)

<<Material Composition>>

The membrane 11 is a member for isolating the positive electrolyte and the negative electrolyte from each other. The membrane 11 can be given as, for example, a material that does not allow an active material (ion) in the electrolyte to pass therethrough, but that allows hydrogen ions generated with a redox reaction of the active material to pass therethrough. An example of the membrane 11 may be an ion-exchange membrane. The ion-exchange membrane has effects of providing (a) high isolation between the positive and negative electrolytes, and (b) high permeability of hydrogen ions that are utilized as charge carriers in the RF battery 10. Therefore, the battery cell 1 including the ion-exchange membrane as the membrane 11 can construct the RF battery 10 capable of satisfactorily developing the battery reaction.

An example of the membrane 11 made of the ion-exchange membrane may be a fluorine-based cation exchange membrane containing a fluorine-based polyelectrolyte polymer with an ion-exchange group. An example of the ion-exchange group may be a sulfonic acid. A cluster size of the ion-exchange group may be, for example, 2.5 nm or more. Grams of dry weight of the fluorine-based polyelectrolyte polymer per equivalent of the ion-exchange group (hereinafter also called an "equivalent weight EW") may be, for example, 950 g/eq or less. The membrane 11 satisfying the above-mentioned requirement has high proton conductivity. Therefore, the RF battery 10 including that type of membrane 11 can improve battery characteristics such as voltage efficiency. In addition, the membrane 11 has high durability. Therefore, the RF battery 10 including that type of membrane 11 is easy to prevent the occurrence of a short circuit attributable to damage of the membrane 11.

Here, the cluster size of the ion-exchange group is defined as a value that is measured by a small-angle X-ray scattering method (SAXS) in water at 25° C. The measurement of the cluster size is advantageously to be performed by referring to a known measuring method. For example, a measuring method disclosed in Japanese Patent No. 6005065 can be referred to. An outline of the disclosed measuring method is as follows. It is assumed that a cluster structure can be represented by a core-shell type rigid sphere with a particle size distribution. An average cluster diameter is determined by fitting a theoretical scattering formula based on the assumed model to a region in an actually measured scattering profile where scattering caused by clusters is dominant. In the assumed model, a core portion corresponds to the cluster, and a diameter of the core portion is the cluster size (average cluster diameter). The shell is an imaginary one. A thickness of the shell is assumed to be 0.25 nm.

The above-mentioned equivalent weight EW may be measured by performing salt substitution of the fluorine-based polyelectrolyte polymer that constitutes the membrane 11, and then performing back titration of an obtained solution with an alkaline solution.

When the cluster size of the ion-exchange group is 2.5 nm or more, the hydrogen ions are easy to permeate through the membrane, and electrical resistance can be easily reduced. In addition, the RF battery 10 is easy to reduce the cell resistance. When the cluster size is 2.55 nm or more or 2.60 nm or more, it is easy to further reduce the cell resistance. When the cluster size is 3.20 nm or less, large-sized ions are hard to permeate through the membrane, and higher proton conductivity is obtained. Furthermore, in such a case, permeability of the ions serving as the active materials is avoided from being excessively high, and it is easy to suppress a deterioration of current efficiency. From the above-described point of view, the cluster size may be set to be 3.00 nm or less or 2.95 nm or less. A polymer structure, a polymer composition, membrane formation conditions, and so on are advantageously to be adjusted such that the cluster size has a desired value. For example, there is a tendency that, as the equivalent weight EW reduces, the cluster size increases.

When the equivalent weight EW is 950 g/eq or less, high hydrophilicity is obtained, and the electrical resistance can be easily reduced. In addition, the RF battery 10 is easy to reduce the cell resistance. When the equivalent weight EW is 900 g/eq or less, 850 g/eq or less, or 800 g/eq or less, it is easy to further reduce the cell resistance. When the equivalent weight EW is 500 g/eq or more, the membrane has high water resistance while exhibiting high hydrophilicity. From the above-mentioned points, the equivalent weight EW may be set to be 550 g/eq or more, 580 g/eq or more, or 620 g/eq or more. For example, a copolymerization ratio and a monomer species of a fluorine-based monomer, which is a raw material of the fluorine-based polyelectrolyte polymer, is advantageously to be adjusted such that the equivalent weight EW has a desired value.

<<Thickness>>

A thickness $t_{11}$ (FIG. 4) of the membrane 11 may be, for example, 7 μm or more and 60 μm or less. When the thickness $t_{11}$ is 7 μm or more, the membrane 11 is less susceptible to damage even upon receiving the predetermined compressive stress in a state assembled into the RF battery 10. When the thickness $t_{11}$ is 60 μm or less, the cell resistance is less apt to increase. When the thickness $t_{11}$ is 12 μm or more, 15 μm or more, or 18 μm or more, it is easy to further prevent damage of the membrane 11. When the thickness $t_{11}$ is 50 μm or less, 45 μm or less, or 40 μm or less, it is easy to further suppress the increase of the cell resistance.

(Main Advantageous Effects)

The battery cell 1 according to the embodiment includes the electrode 12 in which the compressive strain under the compressive stress of 0.8 MPa satisfies the above-mentioned predetermined range. That type of electrode 12 is neither too hard nor too soft unlike the electrode disclosed in PTL 1. Therefore, the electrode 12 can be avoided from excessively entering the flow channel 4 (the groove 40) formed in the bipolar plate 15, and is easy to receive the electrolyte from the groove 40. In the battery cell 1 according to the embodiment including that type of electrode 12, the electrode 12 can satisfactorily develop the battery reaction and can ensure high flowability of the electrolyte. Hence the battery cell 1 according to the embodiment can reduce the cell resistance of the RF battery 10 and can suppress the increase of the pressure loss. That type of battery cell 1 can construct the RF battery 10 with more excellent battery characteristics than the prior art. Those advantageous effects will be described in more detail below with reference to the following Test Examples.

The cell stack 2 according to the embodiment can construct the RF battery 10 with more excellent battery characteristics than the related art because of including the battery cell 1 according to the embodiment.

The RF battery 10 according to the embodiment can improve the battery characteristics in comparison with the related art because of including the battery cell 1 according to the embodiment or the cell stack 2 according to the embodiment.

TEST EXAMPLES

After constructing RF batteries by using electrodes with different compressive strains under the compressive stress of 0.8 MPa and then operating the RF batteries to repeat charge and discharge, the cell resistance, those RF batteries were evaluated on the pressure loss, and performance stability as described below. The evaluation results are listed in Tables 1 to 10.

At first, the common points to the following Test Examples 1 to 10 are described.

(Cell Resistance)

In each of the following tests, a cell resistivity of the RF battery 10 is determined as described below.

The RF battery 10 is fabricated as a single-cell battery. The single-cell battery includes an electrode, a membrane, and a bipolar plate satisfying conditions for each of samples. A positive electrode and a negative electrode are prepared as electrodes satisfying the conditions for each of the samples. Each of a pair of cell frames includes the bipolar plate satisfying the conditions for each of the samples. The positive electrolyte and the negative electrolyte are prepared as vanadium sulfate solutions. A concentration of vanadium ions is 1.7 mol/L. In the following tests, electrodes with the same specifications are used for both the positive electrode and the negative electrode. However, specifications of the positive electrode and specifications of the negative electrode may be different from each other. Only one of the positive electrode and the negative electrode may be the electrode satisfying the conditions for each of the samples from the viewpoint of reactivity to the positive active material and reactivity to the negative active material in the electrode, pressure loss, and so on.

The fabricated single-cell battery is charged and discharged at a constant current. A current density is 140 mA/cm$^2$. Here, upon reaching a predetermined switching voltage that is set in advance, charge and discharge are switched over to perform multiple cycles of charge and discharge. After repeating the charge and the discharge, an average voltage and an average current are determined in arbitrary one of the multiple cycles. Moreover, a ratio of the average voltage to the average current (namely, average voltage/average current) is determined. The cell resistivity is obtained as the ratio of average voltage/average current.

The membrane is a fluorine-based cation exchange membrane containing the fluorine-based polyelectrolyte polymer with the ion-exchange group. The ion-exchange group is a sulfonic acid. The bipolar plate includes, in its surface facing the electrode, the flow channel for the electrolyte. As illustrated in FIG. 6A, by way of example, the flow channel includes the first groove formed relatively close to the supply edge of the bipolar plate and the second groove formed relatively close to the drainage edge of the bipolar plate, the first groove and the second groove being alternately arrayed. Each of those grooves is a linear groove extending along the flow direction of the electrolyte. In addition, the first groove and the second groove are arrayed at equal intervals in the extending direction of the supply edge or the drainage edge.

(Pressure Loss)

Figure 7:
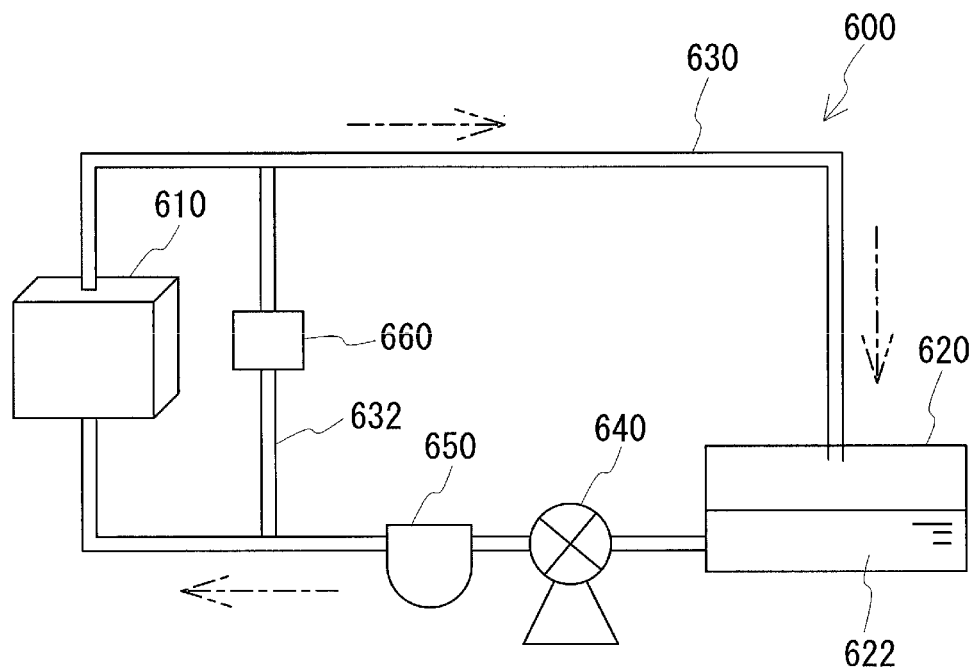
FIG. 7 is a block diagram of a measuring system for use in measuring a pressure loss of the redox flow battery in Test Examples.

In the test, a pressure loss ΔP of the RF battery is measured using a measuring system 600 illustrated in FIG. 7. The measuring system 600 includes a measurement cell 610, a fluid tank 620, a pipe 630, a pump 640, a flowmeter 650, and a differential pressure gauge 660.

The measurement cell 610 is a single-cell battery with the same structure as the single-cell battery that is used in the above-described measurement of the cell resistivity. The fluid tank 620 stores a fluid 622 supplied to the electrode in the measurement cell 610. The fluid 622 may be, for example, water. The pipe 630 connects between the fluid tank 620 and the measurement cell 610. The pump 640 is disposed in the pipe 630 and delivers the fluid 622 in the fluid tank 620 to the measurement cell 610 under pressure. The fluid 622 drained from the measurement cell 610 is returned to the fluid tank 620 via the pipe 630. Thus, the fluid 622 in the fluid tank 620 is supplied to the measurement cell 610 through the pump 640 and the pipe 630 in a circulating manner. Arrows denoted by one-dot-chain lines in FIG. 7 represent a flow direction of the fluid 622. The flowmeter 650 is disposed in the pipe 630 on a discharge side (downstream side) of the pump 640 and on an upstream side of the measurement cell 610. The flowmeter 650 measures a flow rate of the fluid 622 discharged from the pump 640. A branch pipe 632 is disposed in the pipe 630 on a downstream side of the flowmeter 650 while bypassing the measurement cell 610. The differential pressure gauge 660 is disposed in the branch pipe 632. Moreover, the differential pressure gauge 660 is disposed in parallel to the measurement cell 610.

The differential pressure gauge 660 measures a difference ($P_0$–$P_1$) between a pressure $P_0$ of the fluid 622 supplied to the measurement cell 610 and a pressure $P_1$ of the fluid 622 drained from the measurement cell 610. The pressure loss ΔP is the above-mentioned pressure difference ($P_0$–$P_1$). It can be said that, as the pressure loss ΔP reduces, the flowability of the electrolyte in the measurement cell 610 increases.

Evaluation methods will be described below.

(Evaluation of Cell Resistance)

For the cell resistivity of each sample, a relative value to a reference value is determined. The cell resistance is evaluated from the relative value in accordance with a 4-point scale of S and A to C. More specifically, a difference ($x_n$–$x_0$) between a cell resistivity $x_n$ of each sample and a cell resistivity $x_0$ of a sample denoted by "Reference" in Tables 1 to 10. Furthermore, a ratio $\{(x_n-x_0)/x_0\}\times 100(\%)$ of the above-mentioned difference to the cell resistivity $x_0$ as the reference value is calculated. That ratio is used for the evaluation of the cell resistance. When the above-mentioned ratio is a negative value, it can be said that the cell resistivity $x_n$ of a target sample is lower than the cell resistivity $x_0$ of the sample set as "Reference". The evaluation in accordance with the 4-point scale is as follows.

S: The cell resistivity of the target sample is lower than that of "Reference" in Table, and an absolute value of the above-mentioned ratio is 5% or more. In other words, the cell resistivity of the target sample is reduced 5% or more from the reference value.

A: The cell resistivity of the target sample is lower than that of "Reference" in Table, and an absolute value of the above-mentioned ratio is 2% or more and less than 5%. In other words, the cell resistivity of the target sample is reduced in a range of 2% or more and less than 5% from the reference value.

B: The cell resistivity of the target sample is comparable to that of "Reference" in Table, and an absolute value of the above-mentioned ratio is 0% or more and less than 2%.

C: The cell resistivity of the target sample is higher than that of "Reference" in Table.

(Evaluation of Pressure Loss)

For the pressure loss ΔP of each sample, a relative value to a reference value is determined. The pressure loss is evaluated from the relative value in accordance with a 3-point scale of S, A and B. More specifically, a difference ($\Delta P_n-\Delta P_0$) between a pressure loss $\Delta P_0$ of each sample and a pressure loss $\Delta P_0$ of the sample denoted by "Reference" in Tables 1 to 10. Furthermore, a ratio $\{(\Delta P_n-\Delta P_0)/\Delta P_0\}\times 100$ (%) of the above-mentioned difference to the pressure loss $\Delta P_0$ as the reference value is calculated. That ratio is used for the evaluation of the pressure loss. When the above-mentioned ratio is a negative value, it can be said that the pressure loss $\Delta P_0$ of a target sample is lower than the pressure loss $\Delta P_0$ of the sample set as "Reference". The evaluation in accordance with the 3-point scale is as follows.

S: The pressure loss ΔP of the target sample is lower than that of "Reference" in Table, and an absolute value of the above-mentioned ratio is more than 10%. In other words, pressure loss ΔP of the target sample is reduced 10% or more from the reference value.

A: The pressure loss ΔP of the target sample is comparable to that of "Reference" in Table, and the above-mentioned ratio is within ±10%.

B: The pressure loss ΔP of the target sample is higher than that of "Reference" in Table, and an absolute value of the above-mentioned ratio is more than 10%.

(Performance Stability)

For each sample, the above-mentioned cell resistivity is measured five times (n=5), and an average value and a standard deviation of five measured values are determined. The performance stability of the RF battery is evaluated from the determined average value and standard deviation in accordance with a 2-point scale of A and B as follows. It can be said that, as the standard deviation in the measurement of n=5 is smaller, a variation of the cell resistivity is smaller, and the performance of the RF battery is more stable.

A: The standard deviation in the measurement of n=5 is 10% or less of the average value.

B: The standard deviation in the measurement of n=5 is more than 10% of the average value.

(Overall Evaluation)

Furthermore, in the test, overall evaluation is made in accordance with a 4-point scale of S and A to C as follows.

S: At least one of the cell resistance and the pressure loss is evaluated as "S".

A: Both the cell resistance and the pressure loss are evaluated as "A". The sample thus evaluated has higher performance than a prior-art sample described later.

B: At least one of the cell resistance and the pressure loss is evaluated as "B". The sample thus evaluated is comparable to the prior-art sample. Note that the overall evaluation of the prior-art sample described later is assumed to be "B".

C: The cell resistance is evaluated as "C" and the pressure loss is evaluated as "B". The sample thus evaluated is inferior to the prior-art sample.

Test Example 1

RF batteries were constructed by using electrodes with different compressive strains under the compressive stress of 0.8 MPa, as described above, and were then evaluated on the cell resistance, the pressure loss, and the performance stability. The evaluation results are indicated in Table 1.

The electrode of each sample used in Test Example 1 is carbon paper containing the carbon fibers and the carbon binder residue. This electrode does not include carbon particles and satisfies the following conditions.

<<Conditions of Electrode>>

Initial thickness $t_0$: 0.3 mm or more and 2.0 mm or less

Bulk density: 0.11 g/cm$^3$ or more and 0.7 g/cm$^3$ or less

The electrode has a uniform bulk density in the thickness direction of the electrode and does not have a local maximal value.

Stiffness: 10 mN or more and 450 mN or less

Catalyst: no catalyst supported

The membrane of each sample used in Test Example 1 satisfies the following conditions.

<<Conditions of Membrane>>

Thickness of membrane: 20

Cluster size of ion-exchange group: 2.5 nm

Grams of dry weight of the fluorine-based polyelectrolyte polymer per equivalent of the ion-exchange group (hereinafter called an "equivalent weight EW"): 750 g/eq The flow channel formed in the bipolar plate of each sample used in Test Example 1 satisfies the following conditions.

<<Conditions of Flow Channel>>

Groove width: 2.0 mm

Groove depth: 1.5 mm

The groove width and the groove depth are uniform in a lengthwise direction of the groove.

The electrode of each sample is fabricated while the size of the carbon fibers and the amount of the added carbon binder are adjusted such that the electrode satisfies the above-described <<Conditions of Electrode>> and that the compressive strain under the compressive stress of 0.8 MPa satisfies a value (%) indicated in Table 1. For example, when the amount of the added carbon binder is increased in the manufacturing process, the amount of the carbon binder residue is apt to increase. Therefore, the rigidity of the electrode is apt to increase. As a result, the above-specified compressive strain is apt to reduce.

For details of the methods of measuring individual parameter, the above-described items regarding those parameters are to be referred to.

The initial thickness $t_0$ is measured in conformity with the JIS method, as described above, by using a commercially available thickness measuring device (for example, Constant-pressure thickness measuring gauge PG-16J made by TECLOCK Co., Ltd., diameter of sensing element: ϕ25.2 mm) (compressive stress: 0.7 kPa, time: 10 sec).

The above-specified compressive strain is determined from the above-mentioned initial thickness $t_0$ and the thickness $t_{0.8}$. The thickness $t_{0.8}$ is measured in the state of loading the compressive stress of 0.8 MPa, as described above, by using a commercially available strength evaluation device (for example, Micro strength evaluation tester MST-I type HR made by Shimadzu Corporation).

The bulk density is advantageously to be determined, as described above, by capturing an X-ray-CT three-dimensional image with a commercially available three-dimensional image analyzer (for example, Xradia520Versa made by ZEISS Corporation), and by converting an obtained porosity to a bulk density.

The stiffness is advantageously to be determined, as described above, in conformity with the Gurley stiffness test by using a commercially available measuring device (for example, Digital Gurley • stiffness tester Model No. 826 made by Toyo Seiki Seisaku-sho, Ltd.).

The cluster size is advantageously to be determined, as described above, by the SAXS.

The equivalent weight EW is advantageously to be determined, as described above, by performing back titration of the solution, prepared through salt substitution of the fluorine-based polyelectrolyte polymer, with an alkaline solution.

The matters related to the method of manufacturing the electrodes with different compressive strains under the compressive stress of 0.8 MPa and the methods of measuring the individual parameters are similarly applied to later-described Test Examples 2 to 10 as well.

<<Explanation of Samples>>

The compressive strain (%) of each sample under the compressive stress of 0.8 MPa takes a value (%) indicated in Table 1, the value falling within a range of 18% or more and 65% or less.

The above-specified compressive strain of Sample No. 100 is less than 20%. In the evaluation of the cell resistance and the evaluation of the pressure loss, Sample No. 100 is used as "Reference" for the other samples.

The above-specified compressive strains of Samples No. 1 to No. 3 are 20% or more and 60% or less.

The above-specified compressive strain of Sample No. 200 is more than 60%.

In the following, the "samples with the compressive strains of less than 20% under the compressive stress of 0.8 MPa" in Test Examples 1 to 10 are also called related-art samples.

TABLE 1

| | Sample No. | | | | |
|---|---|---|---|---|---|
| | 100 | 1 | 2 | 3 | 200 |
| Electrode compressive strain (%) | 18 | 20 | 40 | 60 | 65 |
| Flow channel groove width (mm) | 2.0 | 2.0 | 2.0 | 2.0 | 2.0 |
| Flow channel groove depth (mm) | 1.5 | 1.5 | 1.5 | 1.5 | 1.5 |
| Cell resistance | Reference | A | A | A | C |
| Pressure loss | Reference | A | A | A | B |
| Performance stability | A | A | A | A | B |
| Overall evaluation | B | A | A | A | C |

As seen from Table 1, comparing with Related-Art Sample No. 100, Samples No. 1 to No. 3 can reduce the cell resistances while the pressure losses are kept comparable. From the evaluation of the performance stability, it is also seen that Samples No. 1 to No. 3 have low cell resistances stably. On the other hand, the cell resistance and the pressure loss of Sample No. 200 are higher than those of Related-Art Sample No. 100. Moreover, Sample1 No. 200 is inferior to Related-Art Sample No. 100 in stability of the cell resistance.

One reason why each of Samples No. 1 to No. 3 is less likely to cause the increase of the pressure loss and can reduce the cell resistance even more is considered as follows. In Samples No. 1 to No. 3, the electrode is not too hard. Therefore, part of the electrode can slightly enter the flow channel (groove) in the bipolar plate. Consequently, it is thought that those Samples can satisfactorily develop the battery reaction and can reduce the cell resistance. Moreover, in Samples No. 1 to No. 3, the electrode is not too soft. Therefore, the electrode does not enter the flow channel significantly. Consequently, it is thought that those Samples have high flowability of the electrolyte in the flow channel and are less likely to increase the pressure loss. On the other hand, regarding Sample No. 200, it is thought that, because the electrode is too soft and enters the flow channel excessively, the cell resistance and the pressure loss are both increased.

This test has proved that the RF battery including the electrode with the compressive strain of 20% or more and 60% or less under the compressive stress of 0.8 MPa can reduce the cell resistance, can suppress the increase of the pressure loss, and hence can improve the battery performance in comparison with the case including the electrode in the above-mentioned related-art sample.

Test Example 2

RF batteries were constructed by using electrodes with different compressive strains under the compressive stress of 0.8 MPa and bipolar plates with the flow channels having different groove widths, as described above, and were then evaluated on the cell resistance, the pressure loss, and the performance stability. The evaluation results are indicated in Table 2.

The electrode of each sample used in Test Example 2 is carbon paper containing the carbon fibers, the carbon binder residue, and the carbon particles, and satisfies the following conditions.

<<Conditions of Electrode>>

Composition of carbon particles: carbon black with average particle size of 480 nm Content of carbon particles: 25% by mass with respect to the carbon paper being 100% by mass Initial thickness $t_0$: 0.75 mm Bulk density: 0.32 g/cm$^3$ The electrode has a uniform bulk density in the thickness direction of the electrode and does not have a local maximal value.

Stiffness: 170 mN

Catalyst: no catalyst supported

The membrane of each sample used in Test Example 2 satisfies the following conditions.

<<Conditions of Membrane>>

Thickness of membrane: 25 μm

Cluster size of ion-exchange group: 2.7 nm

Equivalent weight EW: 850 g/eq

The flow channel formed in the bipolar plate of each sample used in Test Example 2 satisfies the following conditions.

<<Conditions of Flow Channel>>

Groove width: a value (mm) indicated in Table 2, the value falling within a range of 0.55 mm or more and 5.2 mm or less Groove depth: 1.5 mm The groove width and the groove depth are uniform in the lengthwise direction of the groove.

<<Explanation of Samples>>

Samples No. 101 to No. 104 are related-art samples with the compressive strains of less than 20% under the compressive stress of 0.8 MPa. The compressive strain (%) of each sample is indicated in Table 2. In the evaluation of the cell resistance and the evaluation of the pressure loss, Sample No. 101 is used as "Reference" for Sample No. 51. Samples No. 102 to No. 104 are used as "References" for Sample No. 4, Sample No. 5, and Samples No. 6 and No. 52, respectively.

In Samples No. 4 to No. 6, the above-specified compressive strains are 35% and the groove widths are 0.6 mm or more and 5.0 mm or less.

In Sample No. 51, the above-specified compressive strain of is 35% and the groove width is less than 0.6 mm. In Sample No. 52, the above-specified compressive strain is 35% and the groove width is more than 5.0 mm.

51. The cell resistance and the pressure loss of Sample No. 6 are lower than those of Sample No. 52.

One reason why each of Samples No. 4 to No. 6 is less likely to cause the increase of the pressure loss and can reduce the cell resistance even more is considered as follows. In Samples No. 4 to No. 6, the electrode is not too hard, and the groove width of the flow channel (groove) in the bipolar plate is appropriate. Therefore, part of the electrode can slightly enter the flow channel in the bipolar plate. Consequently, it is thought that those Samples can satisfactorily develop the battery reaction and can reduce the cell resistance. Moreover, in Samples No. 4 to No. 6, the electrode is not too soft, and the above-mentioned groove width is appropriate. Therefore, the electrode does not enter the flow channel excessively. Consequently, it is thought that those Samples have high flowability of the electrolyte in the flow channel and are less likely to increase the pressure loss.

On the other hand, the cell resistance and the pressure loss of Sample No. 51 are comparable to those of Related-Art Sample No. 101. One reason of providing such a result is considered as follows. In Sample No. 51, the groove width is too narrow. Therefore, part of the electrode is difficult to enter the flow channel. Consequently, it is thought that the above-described effect of reducing the cell resistance due to the slight intrusion of the electrode into the flow channel cannot be sufficiently obtained in Sample No. 51. It is also thought that, because part of the electrode is difficult to enter the flow channel, Sample No. 51 is less likely to cause the increase of the pressure loss and has the pressure loss comparable to that of Related-Art Sample No. 101.

Sample No. 52 has the cell resistance comparable to that of Sample No. 104, but a decrease of the pressure loss is insufficient. One reason of providing such a result is considered as follows. In Sample No. 52, the electrode slightly enters the flow channel (groove) in the bipolar plate, whereby the effect of reducing the cell resistance is obtained. However, the groove width is too wide in Sample No. 52. Therefore, the electrode enters the flow channel excessively, and the electrolyte does not spread sufficiently in the electrode over a region around the flow channel. Consequently,

TABLE 2

| | Sample No. | | | | | | | | |
|---|---|---|---|---|---|---|---|---|---|
| | 101 | 51 | 102 | 4 | 103 | 5 | 104 | 6 | 52 |
| Electrode compressive strain (%) | 18 | 35 | 18 | 35 | 10 | 35 | 15 | 35 | 35 |
| Flow channel groove width (mm) | 0.55 | 0.55 | 0.6 | 0.6 | 3.0 | 3.0 | 5.0 | 5.0 | 5.2 |
| Flow channel groove depth (mm) | 1.5 | 1.5 | 1.5 | 1.5 | 1.5 | 1.5 | 1.5 | 1.5 | 1.5 |
| Cell resistance | Reference | B | Reference | A | Reference | A | Reference | A | B |
| Pressure loss | Reference | A | Reference | A | Reference | A | Reference | A | B |
| Performance stability | A | A | A | A | A | A | A | A | B |
| Overall evaluation | B | B | B | A | B | A | B | A | B |

In the following, comparison is basically made on the samples with the same groove width.

As seen from Table 2, comparing with Related-Art Samples No. 102 to No. 104, respectively, Samples No. 4 to No. 6 can reduce the cell resistances while the pressure losses are kept comparable. From the evaluation of the performance stability, it is also seen that Samples No. 4 to No. 6 have low cell resistances stably. Furthermore, the cell resistance of Sample No. 4 is lower than that of Sample No.

it is thought that the effect of reducing the cell resistance cannot be sufficiently obtained in Sample No. 52. It is also thought that Sample No. 52 is more apt to increase the pressure loss because the electrode enters the flow channel excessively as described above.

This test has proved that the RF battery including the electrode with the compressive strain of 20% or more and 60% or less under the compressive stress of 0.8 MPa can more reliably improve the battery performance by further including the bipolar plate in which the flow channel with the groove width of 0.6 mm or more and 5.0 mm or less is formed.

Test Example 3

RF batteries were constructed by using electrodes with different compressive strains under the compressive stress of 0.8 MPa and bipolar plates with the flow channels having different groove depths, as described above, and were then evaluated on the cell resistance, the pressure loss, and the performance stability. The evaluation results are indicated in Table 3.

each sample is indicated in Table 3. In the evaluation of the cell resistance and the evaluation of the pressure loss, Sample No. 105 is used as "Reference" for Sample No. 53. Samples No. 106 to No. 108 are used as "References" for Sample No. 7, Sample No. 8, and Samples No. 9 and No. 54, respectively.

In Samples No. 7 to No. 9, the above-specified compressive strains are 50% and the groove depths are 0.6 mm or more and 5.0 mm or less.

In Sample No. 53, the above-specified compressive strain is 50% and the groove depth is less than 0.6 mm. In Sample No. 54, the above-specified compressive strain is 50% and the groove depth is more than 5.0 mm.

TABLE 3

| | Sample No. | | | | | | | | |
|---|---|---|---|---|---|---|---|---|---|
| | 105 | 53 | 106 | 7 | 107 | 8 | 108 | 9 | 54 |
| Electrode compressive strain (%) | 18 | 50 | 15 | 50 | 10 | 50 | 17 | 50 | 50 |
| Flow channel groove width (mm) | 2.0 | 2.0 | 2.0 | 2.0 | 2.0 | 2.0 | 2.0 | 2.0 | 2.0 |
| Flow channel groove depth (mm) | 0.55 | 0.55 | 0.6 | 0.6 | 3.0 | 3.0 | 5.0 | 5.0 | 5.2 |
| Cell resistance | Reference | B | Reference | A | Reference | A | Reference | A | B |
| Pressure loss | Reference | B | Reference | A | Reference | A | Reference | A | A |
| Performance stability | A | B | A | A | A | A | A | A | A |
| Overall evaluation | B | B | B | A | B | A | B | A | B |

The electrode of each sample used in Test Example 3 is carbon paper containing the carbon fibers, the carbon binder residue, and the carbon particles, and satisfies the following conditions.

<<Conditions of Electrode>>

Composition of carbon particles: graphite particles with average particle size of 10

Content of carbon particles: 40% by mass with respect to the carbon paper being 100% by mass Initial thickness $t_0$: 0.9 mm Bulk density: 0.35 g/cm$^3$ The electrode has a uniform bulk density in the thickness direction of the electrode and does not have a local maximal value.

Stiffness: 210 mN

Catalyst: no catalyst supported

The membrane of each sample used in Test Example 3 satisfies the following conditions.

<<Conditions of Membrane>>

Thickness of membrane: 15 μm

Cluster size of ion-exchange group: 2.5 nm

Equivalent weight EW: 700 g/eq

The flow channel formed in the bipolar plate of each sample used in Test Example 3 satisfies the following conditions.

<<Conditions of Flow Channel>>

Groove width: 2.0 mm

Groove depth: a value (mm) indicated in Table 3, the value falling within a range of 0.55 mm or more and 5.2 mm or less The groove width and the groove depth are uniform in the lengthwise direction of the groove.

<<Explanation of Samples>>

Samples No. 105 to No. 108 are related-art samples with the compressive strains of less than 20% under the compressive stress of 0.8 MPa. The compressive strain (%) of In the following, comparison is basically made on the samples with the same groove depth.

As seen from Table 3, comparing with Related-Art Samples No. 106 to No. 108, respectively, Samples No. 7 to No. 9 can reduce the cell resistances while the pressure losses are kept comparable. From the evaluation of the performance stability, it is also seen that Samples No. 7 to No. 9 have low cell resistances stably. Furthermore, the cell resistance and the pressure loss of Sample No. 7 are lower than those of Sample No. 53. The cell resistance of Sample No. 9 is lower than that of Sample No. 54.

One reason why each of Samples No. 7 to No. 9 is less likely to cause the increase of the pressure loss and can reduce the cell resistance even more is considered as follows. In Samples No. 7 to No. 9, the electrode is not too hard, and the groove depth of the flow channel (groove) in the bipolar plate is appropriate. Therefore, part of the electrode can slightly enter the flow channel in the bipolar plate. Consequently, it is thought that those Samples can satisfactorily develop the battery reaction and can reduce the cell resistance. Moreover, in Samples No. 7 to No. 9, the electrode is not too soft, and the above-mentioned groove depth is appropriate. Therefore, the electrode does not enter the flow channel excessively. Consequently, it is thought that those Samples have high flowability of the electrolyte in the flow channel and are less likely to increase the pressure loss.

On the other hand, Sample No. 53 has the cell resistance comparable to that of Related-Art Sample No. 105, but the decrease of the pressure loss is insufficient. One reason of providing such a result is considered as follows. In Sample No. 53, the groove dept is too shallow. It is hence thought that, in Sample No. 53, the cell resistance can be somewhat reduced due to the intrusion of the electrode into the flow channel, but the flowability of the electrolyte is apt to reduce.

The cell resistance and the pressure loss of Sample No. 54 are comparable to those of Related-Art Sample No. 108. One reason of providing such a result is considered as follows. In Sample No. 54, the groove depth is too deep. It is hence thought that Sample No. 54 is difficult to sufficiently develop the above-described effect of reducing the cell resistance due to the slight intrusion of the electrode into the flow channel. It is also thought that, because the electrode does not enter the flow channel excessively, Sample No. 54 has high flowability of the electrolyte and is less likely to cause the increase of the pressure loss.

This test has proved that the RF battery including the electrode with the compressive strain of 20% or more and 60% or less under the compressive stress of 0.8 MPa can more reliably improve the battery performance by further including the bipolar plate in which the flow channel with the groove depth of 0.6 mm or more and 5.0 mm or less is formed.

Test Example 4

RF batteries were constructed by using electrodes with different compressive strains under the compressive stress of 0.8 MPa and with different contents of the carbon particles, as described above, and were then evaluated on the cell resistance, the pressure loss, and the performance stability. The evaluation results are indicated in Table 4.

The electrode of each sample used in Test Example 4 is carbon paper containing the carbon fibers, the carbon binder residue, and the carbon particles, and satisfies the following conditions.

<<Conditions of Electrode>>

Composition of carbon particles: at least one of carbon black with average size of 250 nm and graphite particles with average particle size of 30

Content of carbon particles (total content here): an amount (% by mass) indicated in Table 4, the amount falling within a range of 9% by mass or more to 55% by mass or less with respect to the carbon paper being 100% by mass Initial thickness $t_0$: 0.3 mm or more and 2.0 mm or less
  Bulk density: 0.11 g/cm$^3$ or more and 0.7 g/cm$^3$ or less
  The electrode has a uniform bulk density in the thickness direction of the electrode and does not have a local maximal value.
  Stiffness: 10 mN or more and 450 mN or less
  Catalyst: no catalyst supported The membrane of each sample used in Test Example 4 satisfies the following conditions.

<<Conditions of Membrane>>

Thickness of membrane: 30
  Cluster size of ion-exchange group: 2.7 nm
  Equivalent weight EW: 950 g/eq The flow channel formed in the bipolar plate of each sample used in Test Example 4 satisfies the following conditions.

<<Conditions of Flow Channel>>

Groove width: 2.0 mm
  Groove depth: 1.5 mm

The groove width and the groove depth are uniform in the lengthwise direction of the groove.

<<Explanation of Samples>>

Samples No. 109 to No. 111 are related-art samples with the compressive strains of less than 20% under the compressive stress of 0.8 MPa. In the evaluation of the cell resistance and the evaluation of the pressure loss, Samples No. 109 to No. 111 are used as "References" for Samples No. 55 and No. 10, Sample No. 11, and Samples No. 12 and No. 56, respectively.

In each of Samples No. 10 to No. 12, the above-specified compressive strain is 30% or 50% and the content of the carbon particles is 10% by mass or more and 50% by mass or less.

The above-specified compressive strains (%) of those Samples are indicated in Table 4.

In Sample No. 55, the above-specified compressive strain is 40% and the content of the carbon particles is less than 10% by mass. In Sample No. 56, the above-specified compressive strain is 35% and the content of the carbon particles is more than 50% by mass.

TABLE 4

| | Sample No. | | | | | | | |
|---|---|---|---|---|---|---|---|---|
| | 109 | 55 | 10 | 110 | 11 | 111 | 12 | 56 |
| Electrode compressive strain (%) | 18 | 40 | 50 | 12 | 30 | 18 | 30 | 35 |
| Flow channel groove width (mm) | 2.0 | 2.0 | 2.0 | 2.0 | 2.0 | 2.0 | 2.0 | 2.0 |
| Flow channel groove depth (mm) | 1.5 | 1.5 | 1.5 | 1.5 | 1.5 | 1.5 | 1.5 | 1.5 |
| Content of carbon particles (% by mass) | 10 | 9 | 10 | 25 | 25 | 50 | 50 | 55 |
| Cell resistance | Reference | B | S | Reference | S | Reference | S | B |
| Pressure loss | Reference | A | A | Reference | A | Reference | A | B |
| Performance stability | A | A | A | A | A | A | A | A |
| Overall evaluation | B | B | S | B | S | B | S | B |

In the following, comparison is basically made on the samples with the same content of the carbon particles.

As seen from Table 4, comparing with Related-Art Samples No. 109 to No. 111, respectively, Samples No. 10 to No. 12 can significantly reduce the cell resistances while the pressure losses are kept comparable. From the evaluation of the performance stability, it is also seen that Samples No. 10 to No. 12 have low cell resistances stably. Furthermore, the cell resistance of Sample No. 10 is lower than that of Sample No. 55. The cell resistance and the pressure loss of Sample No. 12 are lower than those of Sample No. 56.

One reason why each of Samples No. 10 to No. 12 is less likely to cause the increase of the pressure loss and can significantly reduce the cell resistance is considered as follows. In Samples No. 10 to No. 12, the electrode is not too hard, and the content of the carbon particles is appropriate. It is hence thought that part of the electrode can slightly enter the flow channel (grove) in the bipolar plate and the surface area of the electrode is increased due to the carbon particles contained in the electrode, whereby those Samples can more satisfactorily develop the battery reaction and can significantly reduce the cell resistance. Moreover, in Samples No. 10 to No. 12, the electrode is not too soft, and the content of the carbon particles is appropriate. It is hence thought that the electrode does not enter the flow channel excessively and the carbon particles are less likely to impede the flowability of the electrolyte, whereby those Samples have high flowability of the electrolyte in the flow channel and are less likely to increase the pressure loss.

On the other hand, the cell resistance and the pressure loss of Sample No. 55 are comparable to those of Related-Art Sample No. 109. One reason of providing such a result is considered as follows. In Sample No. 55, the electrode slightly enters the flow channel (groove) in the bipolar plate and contains the carbon particles, whereby the effect of reducing the cell resistance is obtained. In Sample No. 109, because of containing a larger amount of the carbon particles than in Sample No. 55, the effect of reducing the cell resistance due to the carbon particles contained in the electrode is increased. It is thought that, from the above-mentioned points, the cell resistances of Samples No. 55 and No. 109 are comparable to each other. Furthermore, the above-specified compressive strain of the electrode in Sample No. 55 is larger than that in Sample No. 109, while the content of the carbon particles in Sample No. 55 is smaller than in Sample No. 109. It is thought that, from the above-mentioned point, the pressure loss of Sample No. 55 is comparable to that of Sample No. 109 containing the larger amount of the carbon particles.

Sample No. 56 has the cell resistance comparable to that of Related-Art Sample No. 111, but the decrease of the pressure loss is insufficient. One reason of providing such a result is considered as follows. In Sample No. 56, the electrode slightly enters the flow channel (groove) in the bipolar plate and contains the carbon particles, whereby the effect of reducing the cell resistance is obtained. However, because the amount of the carbon particles is too much, the flowability of the electrolyte in the electrode is reduced and the electrolyte does not spread sufficiently in the electrode. Consequently, it is thought that the effect of reducing the cell resistance cannot be sufficiently obtained in Sample No. 56. It is also thought that Sample No. 56 is more apt to increase the pressure loss because the flowability of the electrolyte in the electrode is reduced as described above.

This test has proved that the RF battery including the electrode with the compressive strain of 20% or more and 60% or less under the compressive stress of 0.8 MPa can more reliably improve the battery performance by, when the electrode contains the carbon particles, further satisfying the condition that the content of the carbon particles is 10% by mass or more and 50% by mass or less.

Test Example 5

RF batteries were constructed by using electrodes with different compressive strains under the compressive stress of 0.8 MPa and with different values of the initial thickness $t_0$, as described above, and were then evaluated on the cell resistance, the pressure loss, and the performance stability. The evaluation results are indicated in Table 5.

The electrode of each sample used in Test Example 5 is carbon paper containing the carbon fibers and the carbon binder residue. The electrode does not contain the carbon particles and satisfies the following conditions.

<<Conditions of Electrode>>

Initial thickness $t_0$: a value (mm) indicated in Table 5, the value falling within a range of 0.25 mm or more and 2.3 mm or less Bulk density: 0.11 g/cm$^3$ or more and 0.7 g/cm$^3$ or less The electrode has a uniform bulk density in the thickness direction of the electrode and does not have a local maximal value.

Stiffness: 10 mN or more and 450 mN or less

Catalyst: no catalyst supported

The membrane of each sample used in Test Example 5 satisfies the following conditions.

<<Conditions of Membrane>>

Thickness of membrane: 45

Cluster size of ion-exchange group: 2.9 nm

Equivalent weight EW: 650 g/eq

The flow channel formed in the bipolar plate of each sample used in Test Example 5 satisfies the following conditions.

<<Conditions of Flow Channel>>

Groove width: a value (mm) indicated in Table 5, the value being 2.0 mm or 3.0 mm Groove depth: a value (mm) indicated in Table 5, the value being one of 1.0 mm, 1.5 mm, and 2.0 mm The groove width and the groove depth are uniform in the lengthwise direction of the groove.

<<Explanation of Samples>>

Samples No. 112 to No. 114 are related-art samples with the compressive strains of less than 20% under the compressive stress of 0.8 MPa. In the evaluation of the cell resistance and the evaluation of the pressure loss, Samples No. 112 to No. 114 are used as "References" for Samples No. 57 and No. 13, Sample No. 14, and Samples No. 15 and No. 58, respectively.

In each of Samples No. 13 to No. 15, the above-specified compressive strain is one of 23%, 30%, and 35%, and the initial thickness $t_0$ of the electrode is 0.3 mm or more and 2.0 mm or less.

The above-specified compressive strains (%) of those Samples are indicated in Table 5.

In Sample No. 57, the above-specified compressive strain is 30% and the initial thickness $t_0$ of the electrode is less than 0.3 mm. In Sample No. 58, the above-specified compressive strain is 35% and the initial thickness $t_0$ of the electrode is more than 2.0 mm.

TABLE 5

| | Sample No. | | | | | | | |
|---|---|---|---|---|---|---|---|---|
| | 112 | 57 | 13 | 113 | 14 | 114 | 15 | 58 |
| Electrode compressive strain (%) | 18 | 30 | 30 | 15 | 23 | 12 | 35 | 35 |
| Flow channel groove width (mm) | 2.0 | 2.0 | 2.0 | 3.0 | 3.0 | 2.0 | 2.0 | 2.0 |

TABLE 5-continued

| | Sample No. | | | | | | | |
|---|---|---|---|---|---|---|---|---|
| | 112 | 57 | 13 | 113 | 14 | 114 | 15 | 58 |
| Flow channel groove depth (mm) | 1.5 | 1.5 | 1.5 | 2.0 | 2.0 | 1.0 | 1.0 | 1.0 |
| Electrode initial thickness (mm) | 0.3 | 0.25 | 0.3 | 1.0 | 1.0 | 2.0 | 2.0 | 2.3 |
| Cell resistance | Reference | B | A | Reference | A | Reference | A | B |
| Pressure loss | Reference | A | A | Reference | A | Reference | A | A |
| Performance stability | A | A | A | A | A | A | A | A |
| Overall evaluation | B | B | A | B | A | B | A | B |

In the following, comparison is basically made on the samples including the electrodes with the same initial thickness $t_0$.

As seen from Table 5, comparing with Related-Art Samples No. 112 to No. 114, respectively, Samples No. 13 to No. 15 can reduce the cell resistances while the pressure losses are kept comparable. From the evaluation of the performance stability, it is also seen that Samples No. 13 to No. 15 have low cell resistances stably. Furthermore, the cell resistance of Sample No. 13 is lower than that of Sample No. 57. The cell resistance of Sample No. 15 is lower than that of Sample No. 58.

One reason why each of Samples No. 13 to No. 15 is less likely to cause the increase of the pressure loss and can reduce the cell resistance even more is considered as follows. In Samples No. 13 to No. 15, the electrode is not too hard, and the initial thickness $t_0$ is appropriate. It is hence thought that part of the electrode slightly enters the flow channel (grove) in the bipolar plate and the electrode is easy to have a large surface area, whereby those Samples can satisfactorily develop the battery reaction and can reduce the cell resistance. Moreover, in Samples No. 13 to No. 15, the electrode is not too soft, and the initial thickness $t_0$ is appropriate. It is hence thought that the electrode does not enter the flow channel excessively and is less likely to deteriorate the flow rate of the electrolyte in the electrode, whereby those Samples have high flowability of the electrolyte and are less likely to increase the pressure loss.

On the other hand, the cell resistance and the pressure loss of Sample No. 57 are comparable to those of Related-Art Sample No. 112. One reason of providing such a result is considered as follows. In Sample No. 57, the electrode slightly enters the flow channel (groove) in the bipolar plate, whereby the effect of reducing the cell resistance is obtained. However, because the initial thickness $t_0$ of the electrode is too thin, the electrode is difficult to have a sufficient surface area. Consequently, it is thought that the effect of reducing the cell resistance cannot be sufficiently obtained in Sample No. 57. It is also thought that, because the electrode does not enter the flow channel excessively, Sample No. 57 has high flowability of the electrolyte and is less likely to cause the increase of the pressure loss.

The cell resistance and the pressure loss of Sample No. 58 are comparable to those of Related-Art Sample No. 114. One reason of providing such a result is considered as follows. In Sample No. 58, the electrode slightly enters the flow channel (groove) in the bipolar plate, whereby the effect of reducing the cell resistance is obtained. However, because the initial thickness $t_0$ of the electrode is too thick, the flow rate of the electrolyte in the electrode is apt to reduce and the electrolyte does not spread sufficiently in the electrode. Consequently, it is thought that the effect of reducing the cell resistance cannot be sufficiently obtained in Sample No. 58. It is also thought that, because the electrode does not enter the flow channel excessively, Sample No. 58 has high flowability of the electrolyte and is less likely to cause the increase of the pressure loss.

This test has proved that the RF battery including the electrode with the compressive strain of 20% or more and 60% or less under the compressive stress of 0.8 MPa can more reliably improve the battery performance by further satisfying the condition that the initial thickness $t_0$ of the electrode is 0.3 mm or more and 2.0 mm or less.

Test Example 6

RF batteries were constructed by using electrodes with different compressive strains under the compressive stress of 0.8 MPa and with different values of the bulk density, as described above, and were then evaluated on the cell resistance, the pressure loss, and the performance stability. The evaluation results are indicated in Table 6.

The electrode of each sample used in Test Example 6 is carbon paper containing the carbon fibers and the carbon binder residue. The electrode does not contain the carbon particles and satisfies the following conditions.

<<Conditions of Electrode>>
Initial thickness $t_0$: 0.3 mm or more and 2.0 mm or less
Bulk density: a value (g/cm$^3$) indicated in Table 6, the value falling within a range of 0.10 g/cm$^3$ or more and 0.73 g/cm$^3$ or less
Stiffness: 10 mN or more and 450 mN or less
Catalyst: no catalyst supported The membrane of each sample used in Test Example 6 satisfies the following conditions.

<<Conditions of Membrane>>
Thickness of membrane: 20 μm
Cluster size of ion-exchange group: 2.7 nm
Equivalent weight EW: 750 g/eq The flow channel formed in the bipolar plate of each sample used in Test Example 6 satisfies the following conditions.

<<Conditions of Flow Channel>>
Groove width: 2.0 mm
Groove depth: 1.5 mm
The groove width and the groove depth are uniform in the lengthwise direction of the groove.

<<Explanation of Samples>>
Samples No. 115 to No. 118 are related-art samples with the compressive strains of less than 20% under the compressive stress of 0.8 MPa. In the evaluation of the cell resistance and the evaluation of the pressure loss, Sample No. 115 is used as "Reference" for Sample No. 59. Samples No. 116 to No. 118 are used as "References" for Samples No. 16 to No. 18, Samples No. 19 and No. 20, and Samples No. 21 and No. 60, respectively.

In each of Samples No. 16 to No. 21, the above-specified compressive strain is one of 25%, 30%, and 50%, and the bulk density of the electrode is 0.11 g/cm³ or more and 0.7 g/cm³ or less.

The above-specified compressive strains (%) of those Samples are indicated in Table 6.

In Sample No. 59, the above-specified compressive strain is 55% and the bulk density of the electrode is less than 0.11 g/cm³. In Sample No. 60, the above-specified compressive strain is 25% and the bulk density of the electrode is more than 0.7 g/cm³.

The electrode of Sample No. 17 marked with (*) in a column of "Bulk density" in Table 6 has a local maximal value of the bulk density in the near-surface region on the side close to the membrane. The electrode of Sample No. 18 marked with () in the column of "Bulk density" has a local maximal value of the bulk density in the near-surface region on the side close to the bipolar plate. The electrode of Sample No. 20 marked with (*) in the column of "Bulk density" has a local maximal value of the bulk density in both the near-surface region on the side close to the membrane and the near-surface region on the side close to the bipolar plate. The electrodes of those Samples are fabricated by the above-described process of applying, drying, and volatilizing the suspension.

constituting the electrode is not too much, whereby those Samples have high flowability of the electrolyte and are less likely to increase the pressure loss.

In particular, as seen from Samples No. 17, No. 18, and No. 20, when the electrode has a local maximal value in at least one of the near-surface region on the side close to the membrane and the near-surface region on the side close to the bipolar plate, the cell resistance can be significantly reduced. One reason of providing such a result is considered as follows. Regarding the electrode in which the bulk density has a local maximal value in the near-surface region on the side close to the membrane, it is thought that, because the reactivity with the active material in the electrolyte can be increased, the cell resistance is apt to reduce. Regarding the electrode in which the bulk density has a local maximal value in the near-surface region on the side close to the bipolar plate, it is thought that, because the contact resistance with respect to the bipolar plate can be reduced, the cell resistance is apt to reduce. From this test, as represented by Sample No. 17, it can be said that the pressure loss can be significantly reduced when the electrode has a local maximal value of the bulk density in the near-surface region on the side close to the membrane. One reason of providing such a result is considered as follows. Even in the case of the bulk density in the entire electrode being 0.11 g/cm³, look-

TABLE 6

| | Sample No. | | | | | | | | | | |
|---|---|---|---|---|---|---|---|---|---|---|---|
| | 115 | 59 | 116 | 16 | 17 | 18 | 117 | 19 | 20 | 21 | 60 |
| Electrode compressive strain (%) | 18 | 55 | 15 | 50 | 50 | 50 | 10 | 30 | 30 | 12 | 25 | 25 |
| Flow channel groove width (mm) | 2.0 | 2.0 | 2.0 | 2.0 | 2.0 | 2.0 | 2.0 | 2.0 | 2.0 | 2.0 | 2.0 | 2.0 |
| Flow channel groove depth (mm) | 1.5 | 1.5 | 1.5 | 1.5 | 1.5 | 1.5 | 1.5 | 1.5 | 1.5 | 1.5 | 1.5 | 1.5 |
| Electrode bulk density (g/cm³) | 0.38 | 0.10 | 0.11 | 0.11 | 0.11(*) | 0.11() | 0.38 | 0.38 | 0.38(*) | 0.70 | 0.70 | 0.73 |
| Cell resistance | Reference | B | Reference | A | S | S | Reference | A | S | Reference | A | B |
| Pressure loss | Reference | A | Reference | A | S | A | Reference | A | A | Reference | A | B |
| Performance stability | A | A | A | A | A | A | A | A | A | A | A | A |
| Overall evaluation | B | B | B | A | S | S | B | A | S | B | A | B |

In the following, comparison is basically made on the samples including the electrodes with the same bulk density.

As seen from Table 6, comparing with Related-Art Samples No. 116 to No. 118, respectively, Samples No. 16 to No. 21 can reduce the cell resistances while the pressure losses are kept comparable or more. From the evaluation of the performance stability, it is also seen that Samples No. 16 to No. 21 have low cell resistances stably. Furthermore, the cell resistance of Sample No. 16 is lower than that of Sample No. 59. The cell resistance and the pressure loss of Sample No. 21 are lower than those of Sample No. 60.

One reason why each of Samples No. 16 to No. 21 is less likely to cause the increase of the pressure loss and can reduce the cell resistance even more is considered as follows. In Samples No. 16 to No. 21, the electrode is not too hard, and the bulk density is appropriate. It is hence thought that part of the electrode can slightly enter the flow channel (grove) in the bipolar plate and the electrode is easy to have a large surface area, whereby those Samples can satisfactorily develop the battery reaction and can reduce the cell resistance. Moreover, in Samples No. 16 to No. 21, the electrode is not too soft, and the bulk density is appropriate. It is hence thought that the electrode does not enter the flow channel excessively and the amount of the carbon materials ing at surface layers of the electrode, the bulk density in the near-surface region on the side close to the bipolar plate becomes relatively low if the bulk density in the near-surface region on the side close to the membrane is relatively high. Consequently, it is thought that, in Sample No. 17, the pressure loss is reduced.

On the other hand, the cell resistance and the pressure loss of Sample No. 59 are comparable to those of Related-Art Sample No. 115. One reason of providing such a result is considered as follows. In Sample No. 59, the electrode slightly enters the flow channel (groove) in the bipolar plate, whereby the effect of reducing the cell resistance is obtained. However, because the bulk density of the electrode is too low, the electrode is difficult to have a sufficient surface area. Consequently, it is thought that the effect of reducing the cell resistance cannot be sufficiently obtained in Sample No. 59. It is also thought that, because the electrode does not enter the flow channel excessively, Sample No. 59 has high flowability of the electrolyte and is less likely to cause the increase of the pressure loss.

The cell resistance of Sample No. 60 is comparable to that of Related-Art Sample No. 118, but the decrease of the pressure loss is insufficient. One reason of providing such a result is considered as follows. In Sample No. 60, the electrode slightly enters the flow channel (groove) in the bipolar plate, whereby the effect of reducing the cell resistance is obtained. However, because the bulk density of the electrode is too high, the flow rate of the electrolyte in the electrode is apt to reduce and the electrolyte is difficult to spread sufficiently in the electrode. Consequently, it is thought that the effect of reducing the cell resistance cannot be sufficiently obtained in Sample No. 60. It is also thought that, in Sample No. 60, the pressure loss is apt to increase because the flow rate of the electrolyte is reduced in the electrode as described above.

This test has proved that the RF battery including the electrode with the compressive strain of 20% or more and 60% or less under the compressive stress of 0.8 MPa can more reliably improve the battery performance by further satisfying the condition that the bulk density of the electrode is 0.11 g/cm$^3$ or more and 0.7 g/cm$^3$ or less.

Test Example 7

RF batteries were constructed by using electrodes with different compressive strains under the compressive stress of 0.8 MPa and with different values of the stiffnesses, as described above, and were then evaluated on the cell resistance, the pressure loss, and the performance stability. The evaluation results are indicated in Table 7.

<<Conditions of Flow Channel>>

Groove width: 3.0 mm

Groove depth: 1.0 mm

The groove width and the groove depth are uniform in the lengthwise direction of the groove.

<<Explanation of Samples>>

Samples No. 119 to No. 122 are related-art samples with the compressive strains of less than 20% under the compressive stress of 0.8 MPa. In the evaluation of the cell resistance and the evaluation of the pressure loss, Samples No. 119 to No. 122 are used as "References" for Samples No. 61 and No. 22, Sample No. 23, Sample No. 24, and Samples No. 25 and No. 62, respectively.

In each of Samples No. 22 to No. 25, the above-specified compressive strain is one of 30%, 40%, and 50%, and the stiffness of the electrode is 10 mN or more and 450 mN or less.

The above-specified compressive strains (%) of those Samples are indicated in Table 7.

In Sample No. 61, the above-specified compressive strain is 50% and the stiffness of the electrode is less than 10 mN. In Sample No. 62, the above-specified compressive strain is 32% and the stiffness of the electrode is more than 450 mN.

TABLE 7

| | Sample No. | | | | | | | | | |
|---|---|---|---|---|---|---|---|---|---|---|
| | 61 | 119 | 22 | 120 | 23 | 121 | 24 | 122 | 25 | 62 |
| Electrode compressive strain (%) | 50 | 15 | 50 | 10 | 40 | 18 | 30 | 15 | 30 | 32 |
| Flow channel groove width (mm) | 3.0 | 3.0 | 3.0 | 3.0 | 3.0 | 3.0 | 3.0 | 3.0 | 3.0 | 3.0 |
| Flow channel groove depth (mm) | 1.0 | 1.0 | 1.0 | 1.0 | 1.0 | 1.0 | 1.0 | 1.0 | 1.0 | 1.0 |
| Membrane thickness (μm) | 20 | 20 | 20 | 30 | 30 | 20 | 20 | 55 | 55 | 55 |
| Electrode stiffness (mN) | 8 | 10 | 10 | 250 | 250 | 450 | 450 | 450 | 450 | 470 |
| Cell resistance | B | Reference | A | Reference | A | Reference | A | Reference | A | B |
| Pressure loss | B | Reference | A | Reference | A | Reference | A | Reference | A | A |
| Performance stability | A | A | A | A | A | A | A | A | A | B |
| Overall evaluation | B | B | A | B | A | B | A | B | A | B |

The electrode of each sample used in Test Example 7 is carbon paper containing the carbon fibers and the carbon binder residue. The electrode does not contain the carbon particles and satisfies the following conditions.

<<Conditions of Electrode>>

Initial thickness $t_0$: 0.3 mm or more and 2.0 mm or less

Bulk density: 0.10 g/cm$^3$ or more and 0.7 g/cm$^3$ or less

The electrode has a uniform bulk density in the thickness direction of the electrode and does not have a local maximal value.

Stiffness: a value (mN) indicated in Table 7, the value falling within a range of 8 mN or more and 470 mN or less Catalyst: no catalyst supported The membrane of each sample used in Test Example 7 satisfies the following conditions.

<<Conditions of Membrane>>

Thickness of membrane: a value (m) indicated in Table 7, the value being one of 20 μm, 30 μm, and 55 μm Cluster size of ion-exchange group: 2.7 nm Equivalent weight EW: 750 g/eq The flow channel formed in the bipolar plate of each sample used in Test Example 7 satisfies the following conditions.

In the following, comparison is basically made on the samples including the electrodes with the same stiffness.

As seen from Table 7, comparing with Related-Art Samples No. 119 to No. 122, respectively, Samples No. 22 to No. 25 can reduce the cell resistances while the pressure losses are kept comparable. From the evaluation of the performance stability, it is also seen that Samples No. 22 to No. 25 have low cell resistances stably. Furthermore, the cell resistance and the pressure loss of Sample No. 22 are lower than those of Sample No. 61. The cell resistance of Sample No. 25 is lower than that of Sample No. 62.

One reason why each of Samples No. 22 to No. 25 is less likely to cause the increase of the pressure loss and can reduce the cell resistance even more is considered as follows. In Samples No. 22 to No. 25, the electrode is not too hard, and the stiffness is appropriate. It is hence thought that, in those Samples, part of the electrode slightly enters the flow channel (grove) in the bipolar plate, whereby the effect of reducing the cell resistance can be satisfactorily obtained. Moreover, in Samples No. 22 to No. 25, the electrode is not too soft, and the stiffness is appropriate. It is hence thought that the electrode can be suppressed from entering the flow channel excessively, whereby those Samples have high flowability of the electrolyte and are less likely to increase the pressure loss.

On the other hand, Sample No. 61 has the cell resistance comparable to that of Related-Art Sample No. 119, but the decrease of the pressure loss is insufficient. One reason of providing such a result is considered as follows. In Sample No. 61, the electrode slightly enters the flow channel (groove) in the bipolar plate, whereby the effect of reducing the cell resistance is obtained. However, because the stiffness is too low, the electrode enters the flow channel excessively. Due to the excessive intrusion of the electrode into the flow channel, the electrolyte does not spread sufficiently in the electrode over the region around the flow channel. Consequently, it is thought that the effect of reducing the cell resistance cannot be sufficiently obtained in Sample No. 61. It is also thought that Sample No. 61 is more apt to increase the pressure loss because the electrode enters the flow channel excessively as described above.

The cell resistance and the pressure loss of Sample No. 62 are comparable to those of Related-Art Sample No. 122. One reason of providing such a result is considered as follows. In Sample No. 62, the electrode slightly enters the flow channel (groove) in the bipolar plate, whereby the effect of reducing the cell resistance is obtained. However, because the stiffness of the electrode is too high, the sufficient intrusion of the electrode into the flow channel cannot be ensured. Consequently, it is thought that the effect of reducing the cell resistance cannot be sufficiently obtained in Sample No. 62. It is also thought that, because the electrode does not enter the flow channel excessively, Sample No. 62 has high flowability of the electrolyte and is less likely to cause the increase of the pressure loss.

This test has proved that the RF battery including the electrode with the compressive strain of 20% or more and 60% or less under the compressive stress of 0.8 MPa can more reliably improve the battery performance by further satisfying the condition that the stiffness of the electrode is 10 mN or more and 450 mN or less.

Test Example 8

RF batteries were constructed by using electrodes with different compressive strains under the compressive stress of 0.8 MPa and with catalysts supported thereon, as described above, and were then evaluated on the cell resistance, the pressure loss, and the performance stability. The evaluation results are indicated in Table 8.

A basic structure of the electrode of each sample used in Test Example 8 is similar to that of Sample No. 23 in Test Example 7 described above. However, the electrode of each sample used in Test Example 8 supports a catalyst thereon. Accordingly, the compressive strain of the electrode under the compressive stress of 0.8 MPa in each sample used in Test Example 8 is different from that in Sample No. 23. In the electrode of each sample used in Test Example 8, an amount of the catalyst supported on the electrode is adjusted such that the above-specified compressive strain becomes 29.5% and the above-mentioned <<Conditions of Electrode>> are satisfied. The amount of the supported catalyst is selected from a range of 1% by mass or more and 15% by mass or less with respect to the electrode being 100% by mass.

<<Explanation of Samples>>

The electrodes in Samples No. 26 to No. 39 support catalysts made of oxides or carbides. Compositions of the catalysts are tungsten carbide (WC), antimony oxide ($Sb_2O_3$), silicon carbide (SiC), titanium carbide (TiC), cerium oxide ($CeO_2$), niobium oxide ($Nb_2O_5$), tin oxide ($SnO_2$), bismuth oxide ($Bi_2O_3$), rhenium oxide ($ReO_3$), tantalum oxide ($Ta_2O_5$), iridium oxide ($IrO_2$), barium ruthenate ($BaRuO_2$), molybdenum oxide ($MoO_3$), and lead oxide (PbO) in the order of the samples listed in Table 8.

In the evaluation of the cell resistance and the evaluation of the pressure loss, Sample No. 23 is used as "References" for the other samples.

TABLE 8

| | Sample No. | | | | | | | |
|---|---|---|---|---|---|---|---|---|
| | 23 | 26 | 27 | 28 | 29 | 30 | 31 | 32 |
| Electrode compressive strain (%) | 40 | 29.5 | 29.5 | 29.5 | 29.5 | 29.5 | 29.5 | 29.5 |
| Flow channel groove width (mm) | 3.0 | 3.0 | 3.0 | 3.0 | 3.0 | 3.0 | 3.0 | 3.0 |
| Flow channel groove depth (mm) | 1.0 | 1.0 | 1.0 | 1.0 | 1.0 | 1.0 | 1.0 | 1.0 |
| Electrode stiffness (mN) | 250 | 250 | 250 | 250 | 250 | 250 | 250 | 250 |
| Catalyst composition | — | WC | $Sb_2O_3$ | SiC | TiC | $CeO_2$ | $Nb_2O_5$ | $SnO_2$ |
| Cell resistance | A (Reference) | S | S | S | S | S | S | S |
| Pressure loss | A (Reference) | A | A | A | A | A | A | A |
| Performance stability | A | A | A | A | A | A | A | A |
| Overall evaluation | A | S | S | S | S | S | S | S |

| | Sample No. | | | | | | |
|---|---|---|---|---|---|---|---|
| | 33 | 34 | 35 | 36 | 37 | 38 | 39 |
| Electrode compressive strain (%) | 29.5 | 29.5 | 29.5 | 29.5 | 29.5 | 29.5 | 29.5 |
| Flow channel groove width (mm) | 3.0 | 3.0 | 3.0 | 3.0 | 3.0 | 3.0 | 3.0 |
| Flow channel groove depth (mm) | 1.0 | 1.0 | 1.0 | 1.0 | 1.0 | 1.0 | 1.0 |
| Electrode stiffness (mN) | 250 | 250 | 250 | 250 | 250 | 250 | 250 |
| Catalyst composition | $Bi_2O_3$ | $ReO_3$ | $Ta_2O_5$ | $IrO_2$ | $BaRuO_3$ | $MoO_3$ | PdO |
| Cell resistance | S | S | S | S | S | S | S |

TABLE 8-continued

| | | | | | | | |
|---|---|---|---|---|---|---|---|
| Pressure loss | A | A | A | A | A | A | A |
| Performance stability | A | A | A | A | A | A | A |
| Overall evaluation | S | S | S | S | S | S | S |

As seen from Table 8, comparing with Sample No. 23, any of Samples No. 26 to No. 39 can reduce the cell resistance even more while the pressure loss is kept comparable. It can be hence said that, comparing with Related-Art Sample No. 120 in Test Example 7 described above, any of Samples No. 26 to No. 39 can significantly reduce the cell resistance while the pressure loss is kept comparable.

This test has proved that the RF battery including the electrode with the compressive strain of 20% or more and 60% or less under the compressive stress of 0.8 MPa can more reliably improve the battery performance by further supporting the catalyst on the electrode.

Test Example 9

RF batteries were constructed by using electrodes with different compressive strains under the compressive stress of 0.8 MPa and membranes with different thicknesses, as described above, and were then evaluated on the cell resistance, the pressure loss, and the performance stability. The evaluation results are indicated in Table 9.

The electrode of each sample used in Test Example 9 is carbon paper containing the carbon fibers and the carbon binder residue. The electrode does not contain the carbon particles and satisfies the following conditions.

The flow channel formed in the bipolar plate of each sample used in Test Example 9 satisfies the following conditions.
<<Conditions of Flow Channel>>
Groove width: 2.0 mm
Groove depth: 1.5 mm
The groove width and the groove depth are uniform in the lengthwise direction of the groove.
<<Explanation of Samples>>
Samples No. 124 to No. 126 are related-art samples with the compressive strains of less than 20% under the compressive stress of 0.8 MPa. In the evaluation of the cell resistance and the evaluation of the pressure loss, Samples No. 124 to No. 126 are used as "References" for Samples No. 63 and No. 40, Sample No. 41, and Samples No. 42 and No. 64, respectively.

In each of Samples No. 40 to No. 42, the above-specified compressive strain is one of 25%, 30%, and 40%, and the thickness of the membrane is 7 μm or more and 60 μm or less.

The above-specified compressive strains (%) of those Samples are indicated in Table 9.

In Sample No. 63, the above-specified compressive strain is 30% and the thickness of the membrane is less than 7 μm. In Sample No. 64, the above-specified compressive strain is 25% and the thickness of the membrane is more than 60 μm.

TABLE 9

| | Sample No. | | | | | | | |
|---|---|---|---|---|---|---|---|---|
| | 63 | 124 | 40 | 125 | 41 | 126 | 42 | 64 |
| Electrode compressive strain (%) | 30 | 18 | 25 | 15 | 40 | 10 | 30 | 25 |
| Flow channel groove wrath (mm) | 2.0 | 2.0 | 2.0 | 2.0 | 2.0 | 2.0 | 2.0 | 2.0 |
| Flow channel groove depth (mm) | 1.5 | 1.5 | 1.5 | 1.5 | 1.5 | 1.5 | 1.5 | 1.5 |
| Membrane thickness (μm) | 5 | 7 | 7 | 25 | 25 | 60 | 60 | 65 |
| Cell resistance | B | Reference | A | Reference | A | Reference | A | B |
| Pressure loss | A | Reference | A | Reference | A | Reference | A | A |
| Performance stability | B | B | A | A | A | A | A | A |
| Overall evaluation | B | B | A | B | A | B | A | B |

<<Conditions of Electrode>>
Initial thickness $t_0$: 0.3 mm or more and 2.0 mm or less
Bulk density: 0.11 g/cm³ or more and 0.7 g/cm³ or less
The electrode has a uniform bulk density in the thickness direction of the electrode and does not have a local maximal value.
Stiffness: 10 mN or more and 450 mN or less
Catalyst: no catalyst supported
The membrane of each sample used in Test Example 9 satisfies the following conditions.
<<Conditions of Membrane>>
Thickness of membrane: a value (μm) indicated in Table 9, the value falling within a range of 5 μm or more and 65 μm or less
Cluster size of ion-exchange group: 2.5 nm or more
Equivalent weight EW: 950 g/eq In the following, comparison is basically made on the samples including the membranes with the same thickness.

As seen from Table 9, comparing with Related-Art Samples No. 124 to No. 126, respectively, Samples No. 40 to No. 42 can reduce the cell resistances while the pressure losses are kept comparable. From the evaluation of the performance stability, it is also seen that Samples No. 40 to No. 42 have low cell resistances stably. Furthermore, the cell resistance of Sample No. 40 is lower than that of Sample No. 63. The cell resistance of Sample No. 42 is lower than that of Sample No. 64.

One reason why each of Samples No. 40 to No. 42 is less likely to cause the increase of the pressure loss and can reduce the cell resistance even more is considered as follows. In Samples No. 40 to No. 42, the electrode is not too hard. It is hence thought that, in those Samples, part of the electrode slightly enters the flow channel (grove) in the bipolar plate, whereby the effect of reducing the cell resistance can be satisfactorily obtained. Moreover, in those Samples, the thickness of the membrane is appropriate. It is hence thought that those Samples can prevent damage of the membrane and are less likely to cause the increase of the cell resistance attributable to the membrane itself. In contrast, in Related-Art Sample No. 124, the membrane is partly damaged by the electrode. Accordingly, a short circuit is caused. It is hence thought that, because of the short circuit, the cell resistance is increased in Related-Art Sample No. 124. It is also thought that Related-Art Sample No. 124 is difficult to maintain stable performance due to the damage of the membrane.

Looking at the pressure loss, in Samples No. 40 to No. 42, the electrode is not too soft. It is hence thought that the electrode does not enter the flow channel excessively, whereby those Samples have high flowability of the electrolyte and are less likely to increase the pressure loss.

On the other hand, the cell resistance and the pressure loss of Sample No. 63 are comparable to those of Related-Art Sample No. 124. One reason of providing such a result is considered as follows. In Sample No. 63, the electrode slightly enters the flow channel (groove) in the bipolar plate, whereby the effect of reducing the cell resistance is obtained. Even in the electrode in which the compressive strain under the compressive stress of 0.8 MPa is appropriate, however, the membrane may be locally damaged if the membrane is too thin. It is hence thought that, as a result of causing a local short circuit due to the local damage of the membrane, the effect of reducing the cell resistance cannot be sufficiently obtained in Sample No. 63. It is also thought that the stable performance is difficult to maintain in some cases due to the local damage of the membrane. However, the damage of the membrane disposed in Sample No. 63 is much less than that in Related-Art Sample No. 124. From the above-mentioned points, the electrode of Sample No. 63 can be said as being easier to prevent the damage of the membrane than the electrode of Related-Art Sample No. 124. It is also thought that, because the electrode does not enter the flow channel excessively, Sample No. 63 has high flowability of the electrolyte and is less likely to cause the increase of the pressure loss.

The cell resistance and the pressure loss of Sample No. 64 are comparable to those of Related-Art Sample No. 126. One reason of providing such a result is considered as follows. In Sample No. 64, the electrode slightly enters the flow channel (groove) in the bipolar plate, whereby the effect of reducing the cell resistance is obtained. However, it is thought that, in Sample No. 64, because the membrane is too thick, the cell resistivity is increased due to the electric resistance of the membrane itself and hence the effect of reducing the cell resistance cannot be sufficiently obtained. It is also thought that, because the electrode does not enter the flow channel excessively, Sample No. 64 has high flowability of the electrolyte and is less likely to cause the increase of the pressure loss.

This test has proved that the RF battery including the electrode with the compressive strain of 20% or more and 60% or less under the compressive stress of 0.8 MPa can more reliably improve the battery performance by further satisfying the condition that the thickness of the membrane is 7 μm or more and 60 μm or less.

Test Example 10

RF batteries were constructed by using electrodes with different compressive strains under the compressive stress of 0.8 MPa and membranes different in both the cluster size of the ion-exchange group and the equivalent weight EW, as described above, and were then evaluated on the cell resistance, the pressure loss, and the performance stability. The evaluation results are indicated in Table 10.

The electrode of each sample used in Test Example 10 is carbon paper containing the carbon fibers and the carbon binder residue. The electrode does not contain the carbon particles and satisfies the following conditions.

<<Conditions of Electrode>>

Initial thickness $t_0$: 0.3 mm or more and 2.0 mm or less

Bulk density: 0.11 g/cm$^3$ or more and 0.7 g/cm$^3$ or less

The electrode has a uniform bulk density in the thickness direction of the electrode and does not have a local maximal value.

Stiffness: 10 mN or more and 450 mN or less

Catalyst: no catalyst supported

The membrane of each sample used in Test Example 10 satisfies the following conditions.

<<Conditions of Membrane>>

Thickness of membrane: a value (m) indicated in Table 10, the value being one of 20 μm, 25 μm, and 30 μm Cluster size of ion-exchange group: a value (nm) indicated in Table 10, the value falling within a range of 2.3 nm or more and 3.1 nm or less Equivalent weight EW: a value (g/eq) indicated in Table 10, the value falling within a range of 630 g/eq or more and 980 g/eq or less The flow channel formed in the bipolar plate of each sample used in Test Example 10 satisfies the following conditions.

<<Conditions of Flow Channel>>

Groove width: 2.0 mm

Groove depth: 1.5 mm

The groove width and the groove depth are uniform in the lengthwise direction of the groove.

<<Explanation of Samples>>

Samples No. 127 to No. 129 are related-art samples with the compressive strains of less than 20% under the compressive stress of 0.8 MPa. In the evaluation of the cell resistance and the evaluation of the pressure loss, Samples No. 128 and No. 129 are used as "References" for Sample No. 44 and Samples No. 45 and No. 66, respectively. In the evaluation of the cell resistance, Sample No. 65 is used as "Reference" for Samples No. 127 and No. 43 (the reason is described later). In the evaluation of the pressure loss, Sample No. 127 is used as "Reference" for Samples No. 65 and No. 43.

In each of Samples No. 43 to No. 45, the above-specified compressive strain is one of 30%, 40%, and 55%, the cluster size of the ion-exchange group is 2.5 nm or more, and the equivalent weight EW is 950 g/eq or less.

The above-specified compressive strains (%) of those Samples are indicated in Table 10.

In Sample No. 65, the above-specified compressive strain is 30%, the cluster size of the ion-exchange group is less than 2.5 nm, and the equivalent weight EW is 950 g/eq or less. In Sample No. 66, the above-specified compressive strain is 25%, the cluster size of the ion-exchange group is 2.5 nm or more, and the equivalent weight EW is more than 950 g/eq.

TABLE 10

| | Sample No. | | | | | | | |
|---|---|---|---|---|---|---|---|---|
| | 127 | 65 | 43 | 128 | 44 | 129 | 45 | 66 |
| Electrode compressive strain (%) | 18 | 30 | 30 | 15 | 40 | 12 | 55 | 25 |
| Flow channel groove width (mm) | 2.0 | 2.0 | 2.0 | 2.0 | 2.0 | 2.0 | 2.0 | 2.0 |
| Flow channel groove depth (mm) | 1.5 | 1.5 | 1.5 | 1.5 | 1.5 | 1.5 | 1.5 | 1.5 |
| Membrane thickness (μm) | 20 | 20 | 20 | 25 | 25 | 30 | 30 | 30 |
| Membrane cluster size of ion-exchange group (nm) | 2.3 | 2.3 | 2.5 | 2.7 | 2.7 | 3.1 | 3.1 | 3.1 |
| Membrane equivalent weight EW (g/eq) | 630 | 630 | 630 | 850 | 850 | 950 | 950 | 980 |
| Cell resistance | B | Reference | A | Reference | A | Reference | A | B |
| Pressure loss | Reference | A | A | Reference | A | Reference | A | A |
| Performance stability | B | A | A | A | A | A | A | A |
| Overall evaluation | B | B | A | B | A | B | A | B |

In the following, comparison is basically made on the samples including the membranes with the same cluster size of the ion-exchange group.

As seen from Table 10, comparing with Related-Art Samples No. 127 to No. 129, respectively, Samples No. 43 to No. 45 can reduce the cell resistances while the pressure losses are kept comparable. From the evaluation of the performance stability, it is also seen that Samples No. 43 to No. 45 have low cell resistances stably. Furthermore, the cell resistance of Sample No. 43 is lower than that of Sample No. 65. The cell resistance of Sample No. 45 is lower than that of Sample No. 66.

One reason why each of Samples No. 43 to No. 45 is less likely to cause the increase of the pressure loss and can reduce the cell resistance even more is considered as follows. In Samples No. 43 to No. 45, the electrode is not too hard. It is hence thought that, in those Samples, part of the electrode slightly enters the flow channel (grove) in the bipolar plate, whereby the effect of reducing the cell resistance can be satisfactorily obtained. Furthermore, in those Samples, the cluster size of the ion-exchange group in the membrane and the equivalent weight EW are appropriate. It is hence thought that those Samples are less likely to cause the increase of the cell resistance attributable to the membrane itself. In contrast, in Related-Art Sample No. 127, the above-mentioned cluster size is too small and the electrical resistance of the membrane itself is high. In addition, membrane strength is low. Therefore, the membrane is partly damaged by the electrode. Consequently, a short circuit is caused. It is thought that, from the above-mentioned points, the cell resistance is increased in Related-Art Sample No. 127. Moreover, in Related-Art Sample No. 127, the battery performance is unstable due to the above-mentioned short circuit. In consideration of those points, Sample No. 65 is used as the reference in the evaluation of the cell resistance instead of Sample No. 127.

Looking at the pressure loss, in Samples No. 43 to No. 45, the electrode is not too soft. It is hence thought that the electrode does not enter the flow channel significantly, whereby those Samples have high flowability of the electrolyte and are less likely to increase the pressure loss.

On the other hand, Sample No. 65 has the pressure loss comparable to that of Related-Art Sample No. 127, but the cell resistance of No. 65 is higher than that of Sample No. 43. One reason of providing such a result is considered as follows. In Sample No. 65, the electrode slightly enters the flow channel (groove) in the bipolar plate, whereby the effect of reducing the cell resistance is obtained. In Sample No. 65, however, the cluster size of the ion-exchange group in the membrane is too small and the electrical resistance of the membrane itself is too high. Consequently, it is thought that the effect of reducing the cell resistance cannot be sufficiently obtained in Sample No. 65. The membrane of Sample No. 65 is not damaged. From the above-mentioned points, the electrode of Sample No. 65 can be said as being easier to prevent the damage of the membrane than the electrode of Related-Art Sample No. 127. Furthermore, it is thought that, because the electrode does not enter the flow channel excessively, Sample No. 65 has high flowability of the electrolyte and is less likely to increase the pressure loss.

On the other hand, the cell resistance and the pressure loss of Sample No. 66 are comparable to those of Related-Art Sample No. 129. One reason of providing such a result is considered as follows. In Sample No. 66, the electrode slightly enters the flow channel (groove) in the bipolar plate, whereby the effect of reducing the cell resistance is obtained. However, it is thought that, in Sample No. 66, because the equivalent weight EW of the membrane is too large, the cell resistivity is increased. Consequently, it is thought that the effect of reducing the cell resistance cannot be sufficiently obtained. It is also thought that, because the electrode does not enter the flow channel excessively, Sample No. 66 has high flowability of the electrolyte and is less likely to cause the increase of the pressure loss.

This test has proved that the RF battery including the electrode with the compressive strain of 20% or more and 60% or less under the compressive stress of 0.8 MPa can more reliably improve the battery performance by further satisfying the condition that the cluster size of the ion-exchange group in the membrane is 2.5 nm or more and the equivalent weight EW is 950 g/eq or less.

Although Test Examples 1 to 10 described above represent the evaluation in the case of using the vanadium electrolyte in which vanadium ions are used as the positive and negative active materials, a similar tendency is also obtained in the case of using, as the positive active material, a positive electrolyte containing manganese ions and using, as the negative active material, a negative electrolyte containing titanium ions.

The present invention is not limited to the above-described examples and is intended to include all changes falling within the scope and the concept that are defined in Claims and are equivalent to Claims. For example, in Test Examples 1 to 10 described above, the compressive strain under the compressive stress of 0.8 MPa, the bulk density, the stiffness, the initial thickness $t_0$, the properties of the carbon materials, the composition and the content of the catalyst, the shape, the groove width, and the groove depth of the flow channel in the bipolar plate, the thickness of the membrane, the cluster size of the ion-exchange group, the equivalent weight EW, and so on may be changed.

Additionally, at least one among the following modifications (1) to (3) can be made in practice.

(1) In the case including the multiple battery cells, those battery cells include electrodes with different specifications.

Those specifications may be related to, for example, the compressive strain under the compressive stress of 0.8 MPa, the bulk density, the stiffness, the initial thickness $t_0$, and the properties of the carbon materials.

(2) Specifications of the flow channel in the bipolar plate are changed.

For example, the flow channel 4 may include both the above-described linear grooves 41 and 42 and meandering groove 45. Furthermore, regarding the flow channel 4, for example, the straightening grooves 43 and 44 may be omitted in the flow channel 4 of FIG. 6A. Moreover, regarding the flow channel 4, for example, the flow channel 4 of FIG. 6B may include at least one of the straightening grooves 43 and 44.

(3) In the case of a multi-cell battery, the battery includes membranes with different specifications.

Those specifications may be related to, for example, the material of the membrane and the type, the cluster size, and the equivalent weight EW of the ion-exchange group when the ion-exchange membrane is used.

REFERENCE SIGNS LIST 10 redox flow battery (RF battery)
1 battery cell, 1A positive cell, 1B negative cell
   11 membrane, 12 electrode, 13 positive electrode, 14 negative electrode, 15 bipolar plate
   16, 17 tank, 160, 170 pipe
   161, 171 outgoing pipe, 162, 172 return pipe
   18, 19 pump, 120 surface, 121, 125 near-surface region
   124 projecting portion
2 cell stack
   20 sub-cell stack, 21 end plate, 22 fastening member
   23 supply/drainage plate
3 cell frame
   30 frame body, 31 window portion, 33, 34 liquid supply manifold
   35, 36 liquid drainage manifold, 38 sealing member
4 flow channel
   4i supply edge, 4o drainage edge
   40, 41, 42 groove, 43, 44 straightening groove, 45 meandering groove,
   48 rib portion
50 carbon fiber, 51 carbon binder residue, 52 carbon particle
55 catalyst
6 intermediate apparatus, 7 power generation unit, 8 load
128 measurement sample, 201 fixed lower plate, 202 movable upper plate
600 measuring system
   610 measurement cell, 620 fluid tank, 622 fluid, 630 pipe
   632 branch pipe, 640 pump, 650 flowmeter, 660 differential pressure gauge

The invention claimed is:

1. A battery cell for use in a redox flow battery, the battery cell comprising an electrode, a membrane facing one of both surfaces of the electrode, and a bipolar plate facing the other surface of the electrode,
wherein the bipolar plate includes, in a surface thereof facing the electrode, a flow channel for an electrolyte,
the electrode is a porous body containing carbon materials, and
a compressive strain in a thickness direction of the electrode when a compressive stress of 0.8 MPa is applied in the thickness direction of the electrode is 20% or more and 60% or less,
wherein a stiffness of the electrode is 10 mN or more and 450 mN or less.

2. The battery cell according to claim 1, wherein the flow channel includes a groove with a width of 0.6 mm or more and 5.0 mm or less.

3. The battery cell according to claim 1, wherein the flow channel includes a groove with a depth of 0.6 mm or more and 5.0 mm or less.

4. The battery cell according to claim 1, wherein the electrode is carbon paper containing carbon fibers and carbon binder residue.

5. The battery cell according to claim 1, wherein the electrode is carbon paper containing carbon fibers, carbon binder residue, and carbon particles.

6. The battery cell according to claim 5, wherein a content of the carbon particles is 10% by mass or more and 50% by mass or less.

7. The battery cell according to claim 1, wherein an initial thickness of the electrode is 0.3 mm or more and 2.0 mm or less.

8. The battery cell according to claim 1, wherein a bulk density of the electrode is 0.11 g/cm$^3$ or more and 0.7 g/cm$^3$ or less.

9. The battery cell according to claim 1, wherein the electrode has a bulk density that differs along a thickness direction of the electrode between the membrane and the bipolar plate, and
the bulk density has a local maximal value in at least one of a near-surface region of the electrode on a side close to the membrane and a near-surface region of the electrode on a side close to the bipolar plate.

10. The battery cell according to claim 1, wherein the electrode supports thereon a catalyst made of a non-carbon material.

11. The battery cell according to claim 10, wherein the non-carbon material is at least one type of material among oxides and carbides.

12. The battery cell according to claim 1, wherein the flow channel includes a set of grooves including a first groove formed relatively close to a supply edge of the bipolar plate and a second groove formed relatively close to a drainage edge of the bipolar plate, the first groove and the second groove being arrayed adjacent to each other.

13. The battery cell according to claim 1, wherein the flow channel includes a meandering groove.

14. The battery cell according to claim 1, wherein a thickness of the membrane is 7 μm or more and 60 μm or less.

15. The battery cell according to claim 1, wherein the membrane is an ion-exchange membrane.

16. The battery cell according to claim 15, wherein the ion-exchange membrane is a fluorine-based cation exchange membrane containing a fluorine-based polyelectrolyte polymer with an ion-exchange group, the ion-exchange group is a sulfonic acid,
a cluster size of the ion-exchange group is 2.5 nm or more, and
grams of dry weight of the fluorine-based polyelectrolyte polymer per equivalent of the ion-exchange group are 950 g/eq or less.

17. A cell stack including the battery cell according to claim 1.

18. A redox flow battery including the battery cell according to claim 1.

19. The battery cell according to claim 1, wherein the compressive strain is 21% or more and 60% or less.

20. The battery cell according to claim 1, wherein the compressive strain is 22% or more and 60% or less.

21. The battery cell according to claim 1, wherein the compressive strain is 25% or more and 60% or less.

* * * * *